United States Patent [19]
Colvin et al.

[11] Patent Number: 5,213,639
[45] Date of Patent: May 25, 1993

[54] DAMAGE TOLERANT ALUMINUM ALLOY PRODUCTS USEFUL FOR AIRCRAFT APPLICATIONS SUCH AS SKIN

[75] Inventors: Edward L. Colvin, O'Hara Township, Allegheny County; Jocelyn I. Petit, New Kensington, both of Pa.; Robert W. Westerlund, Bettendorf, Iowa; Paul E. Magnusen, Plum Boro, Pa.

[73] Assignee: Aluminum Company of America, Pittsburgh, Pa.

[21] Appl. No.: 847,352

[22] Filed: Mar. 6, 1992

Related U.S. Application Data

[63] Continuation-in-part of Ser. No. 572,625, Aug. 27, 1990, abandoned, Continuation-in-part of Ser. No. 572,626, Aug. 27, 1990, abandoned.

[51] Int. Cl.$^5$ .............................................. C22F 1/04
[52] U.S. Cl. ................................... 148/693; 148/552; 148/700; 148/417; 148/439; 428/654
[58] Field of Search ............... 148/552, 693, 700, 417, 148/439; 428/654; 420/533

[56] References Cited

U.S. PATENT DOCUMENTS

| | | | |
|---|---|---|---|
| 3,726,725 | 4/1973 | Gold | 148/697 |
| 3,826,688 | 7/1974 | Levy | 148/552 |
| 4,294,625 | 10/1981 | Hyatt et al. | 148/550 |
| 4,336,075 | 6/1982 | Quist et al. | 148/550 |
| 4,816,087 | 3/1989 | Cho | 148/417 |

FOREIGN PATENT DOCUMENTS

| | | |
|---|---|---|
| 038605 | 10/1981 | European Pat. Off. |
| 1122912 | 8/1968 | United Kingdom |

OTHER PUBLICATIONS

*Metals Handbook*, vol. 2, "Properties and Selections: Nonferrous Alloys and Pure Metals", 9th Edition, 1979, pp. 50, 72–75, American Society for Metals, Metals Park, Ohio, US.

J. E. Hatch: "Aluminium", vol. 1, "Properties and Physical Metallurgy", 1st Edition, 1984, pp. 268–269, 361–365, 372–374, American Society for Metals, Metals Park, Ohio, US.

"Aluminum Alloy Development for Subsonic and Supersonic Aircraft", M. V. Hyatt, et al., *Science and Engineering of Light Metals*, published by The Japan Institute of Light Metals, Tokyo, Oct. 1991, pp. 273 to 280.

*Primary Examiner*—R. Dean
*Assistant Examiner*—Robert R. Koehler
*Attorney, Agent, or Firm*—Carl R. Lippert

[57] ABSTRACT

A method of producing a sheet product and improved products having improved levels of toughness and fatigue crack growth resistance at good strength levels. The method comprises providing an aluminum base alloy containing 4 to 4.5% Cu, 1.2 to 1.5% Mg, 0.4 to 0.6% Mn, 0.12% max. Fe, 0.1% max. Si, the remainder aluminum, incidental elements and impurities and hot rolling the alloy, heating the alloy to above 910° F. and additionally hot rolling it in a range of about 600° to 900° F., solution heat treating, preferably for a time of less than about 15 minutes at a solution heat treating temperature, and rapidly cooling and naturally aging. The invention products have very good combinations of strength together with high fracture toughness or low fatigue crack growth rate, or both, making them well suited for aerospace applications such as fuselage skin. The products preferably include a corrosion protecting cladding of aluminum or aluminum alloy.

232 Claims, 12 Drawing Sheets

• Invention
○ Invention Composition/Slab Held at Low Temperature Before Hot Rolling
▨ 2024-T3 Composition/Invention Processing
□ 2024-T3 Composition/Conventional Processing

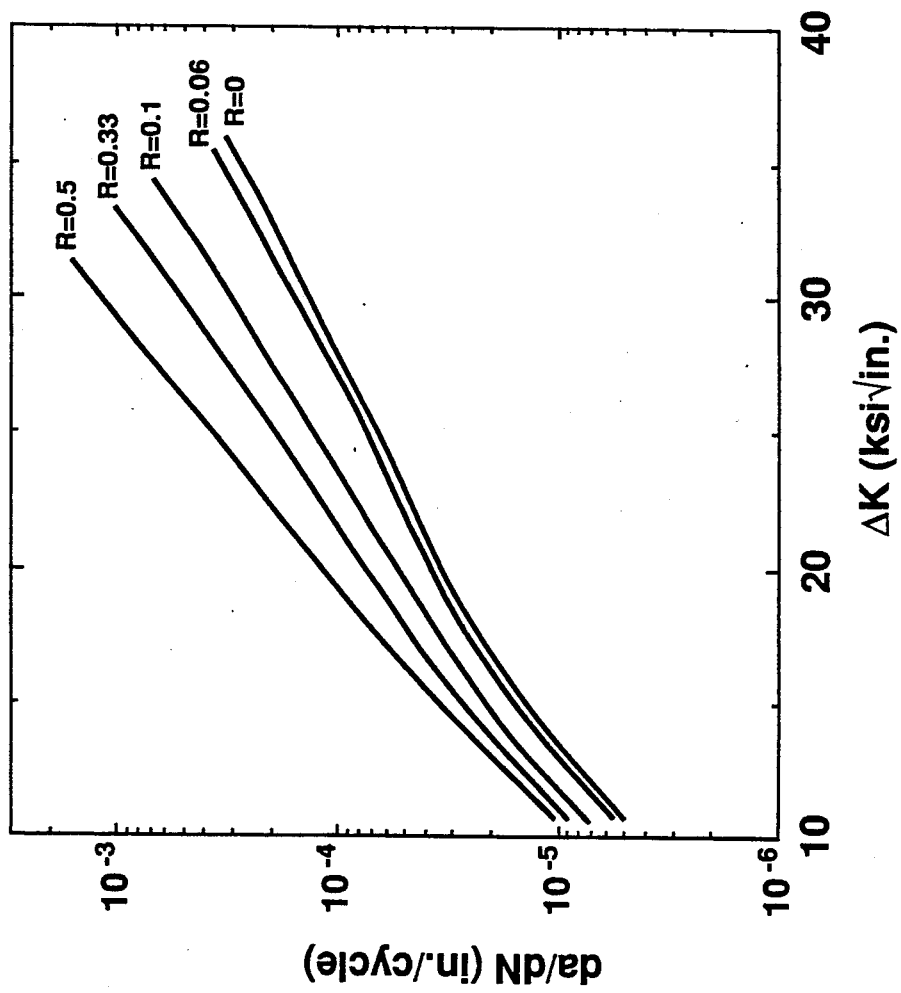

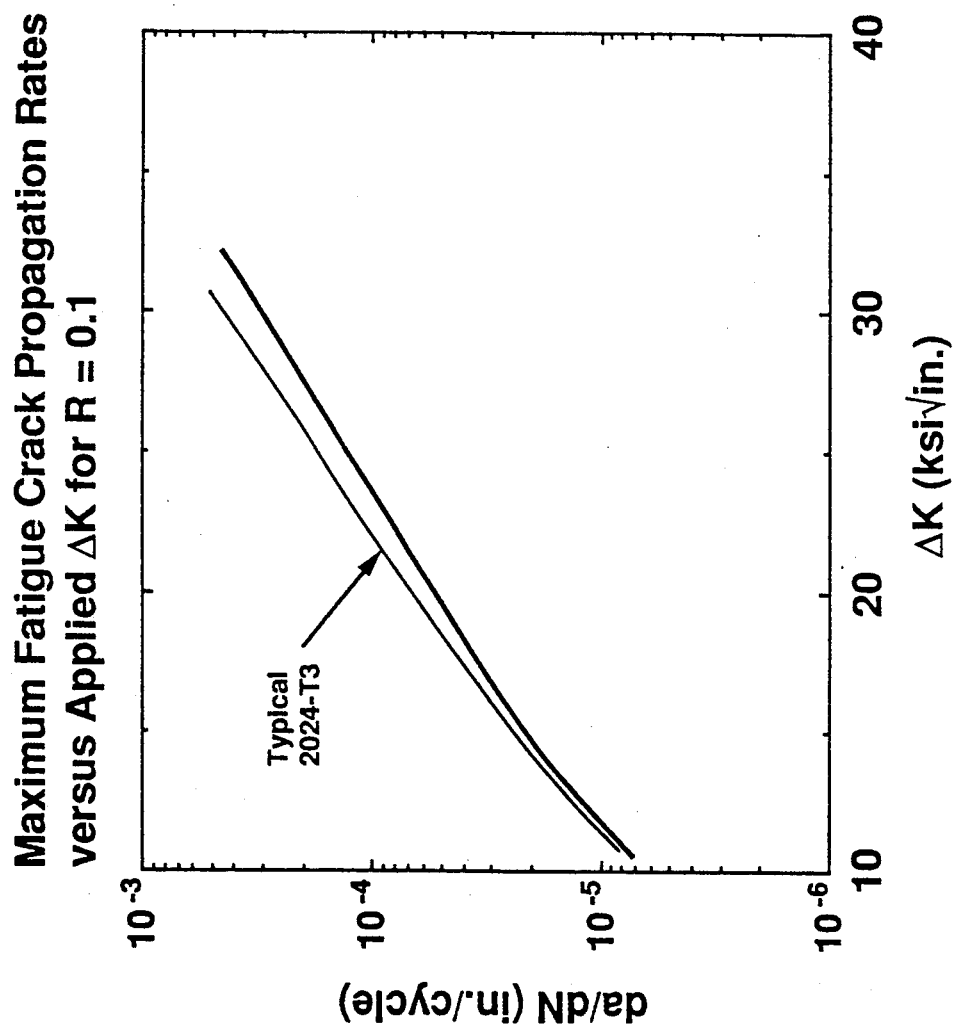

Effect of Humidity on Fatigue Crack Growth Rates of Invention and 2024-T3 Sheet

DAMAGE TOLERANT ALUMINUM ALLOY PRODUCTS USEFUL FOR AIRCRAFT APPLICATIONS SUCH AS SKIN

BACKGROUND OF THE INVENTION

This application is a continuation-in-part of U.S. patent application Ser. Nos. 07/572,625 and 07/572,626, both of which were filed Aug. 27, 1990, the entire contents of which are incorporated herein by reference, and both patent applications now abandoned.

This invention relates to aluminum alloys suitable for use in aircraft applications and, more particularly, it relates to an improved aluminum alloy and processing therefor having improved resistance to fatigue crack growth and fracture toughness and suited to use as aircraft skin.

The design of commercial aircraft requires different sets of properties for different types of structures on the airplane. In many parts, resistance to crack propagation either in the form of fracture toughness or fatigue crack growth is essential. Therefore, many significant benefits can be realized by improving fracture toughness and resistance to fatigue crack propagation.

A new material with improved toughness, for example, will have a higher level of damage tolerance. On the aircraft, this translates to improved safety for passengers and crew and weight savings in the structure which allows for improved fuel economy, longer flight range, greater payload capacity or a combination of these.

Cyclic loading occurs on a commercial jet airplane with each flight as the interior of the airplane is pressurized and then depressurized. Typically, airplanes may see up to 100,000 such pressurization cycles during their normal service lifetime. Slower rates of crack growth during cyclic loading would allow for weight savings, longer service lives (more pressurizing cycles), decreased inspection frequencies and even greater passenger safety. Thus, it will be noted that great benefit is derived from improved fracture toughness and resistance to fatigue crack growth, both of which are related to cyclic loading.

U.S. Pat. No. 4,336,075 discloses the use of AA2000 type aluminum alloy for aircraft wings.

The present invention provides aluminum base alloy sheet products and a method of fabricating sheet products from a body of the alloy. Further, the invention provides aluminum alloy sheet products suitable for aircraft applications such as aircraft fuselage panels, which sheets are clad with a corrosion protecting outer layer. It can be envisioned that the invention can also have benefits in other areas of the aircraft where fracture toughness or fatigue crack growth resistance (or both) are important, such as lower wing skins, horizontal stabilizer, pressure bulkheads and fuselage reinforcements.

SUMMARY OF THE INVENTION

A principal object of the invention is to provide an aluminum alloy and sheet product formed therefrom, the sheet product having improved fracture toughness and resistance to fatigue crack growth while maintaining high strength properties and corrosion resistance.

A further object of the present invention is to provide aluminum alloy sheet products having improved fracture toughness and resistance to fatigue crack growth for aircraft panels.

Yet a further object of the present invention is to provide aluminum alloy sheet products and a process for producing the sheet products so as to provide improved fracture toughness and increased resistance to fatigue crack growth while still maintaining high levels of strength.

Still a further object of the invention is to provide a method for processing an aluminum alloy into clad sheet products having improved resistance to fatigue crack growth while maintaining high strength properties and corrosion resistance.

And still a further object is to provide an Al-Cu-Mg-Mn clad sheet product for use as aircraft panels such as wing or fuselage skins having improved resistance to fatigue crack growth while maintaining high strength levels and improved fracture toughness.

These and other objects will become apparent from a reading of the specification and claims and an inspection of the claims appended hereto.

In accordance with these objects, there is provided a method of producing a sheet product having improved levels of toughness and fatigue crack growth resistance while maintaining high strength, the method comprising providing a body of an aluminum base alloy preferably containing about 4.15 to 4.5 % Cu, 1.2 to 1.45% Mg, 0.4 to 0.7% Mn, 0.1% max. Fe, 0.1% max. Si, the remainder substantially aluminum, incidental elements and impurities. The method further comprises heating a body of the alloy to above 900° F. to dissolve soluble constituents. Thereafter, the body is hot rolled in the range of about 600° to 900° F., and possibly cold rolled, and solution heat treated for a time of less than about 60 minutes, for example, at the solution heat treating temperature, then rapidly cooled (and, optionally, plastically deformed) and naturally aged to provide a sheet product with improved levels of fatigue crack growth resistance and fracture toughness while maintaining high strength levels.

BRIEF DESCRIPTION OF THE DRAWINGS

FIGS. 8, 8a and 8b are plots of maximum fatigue crack growth rate versus $\Delta K$ for the constant load test.

DETAILED DESCRIPTION OF THE PREFERRED EMBODIMENTS

Figure 1:
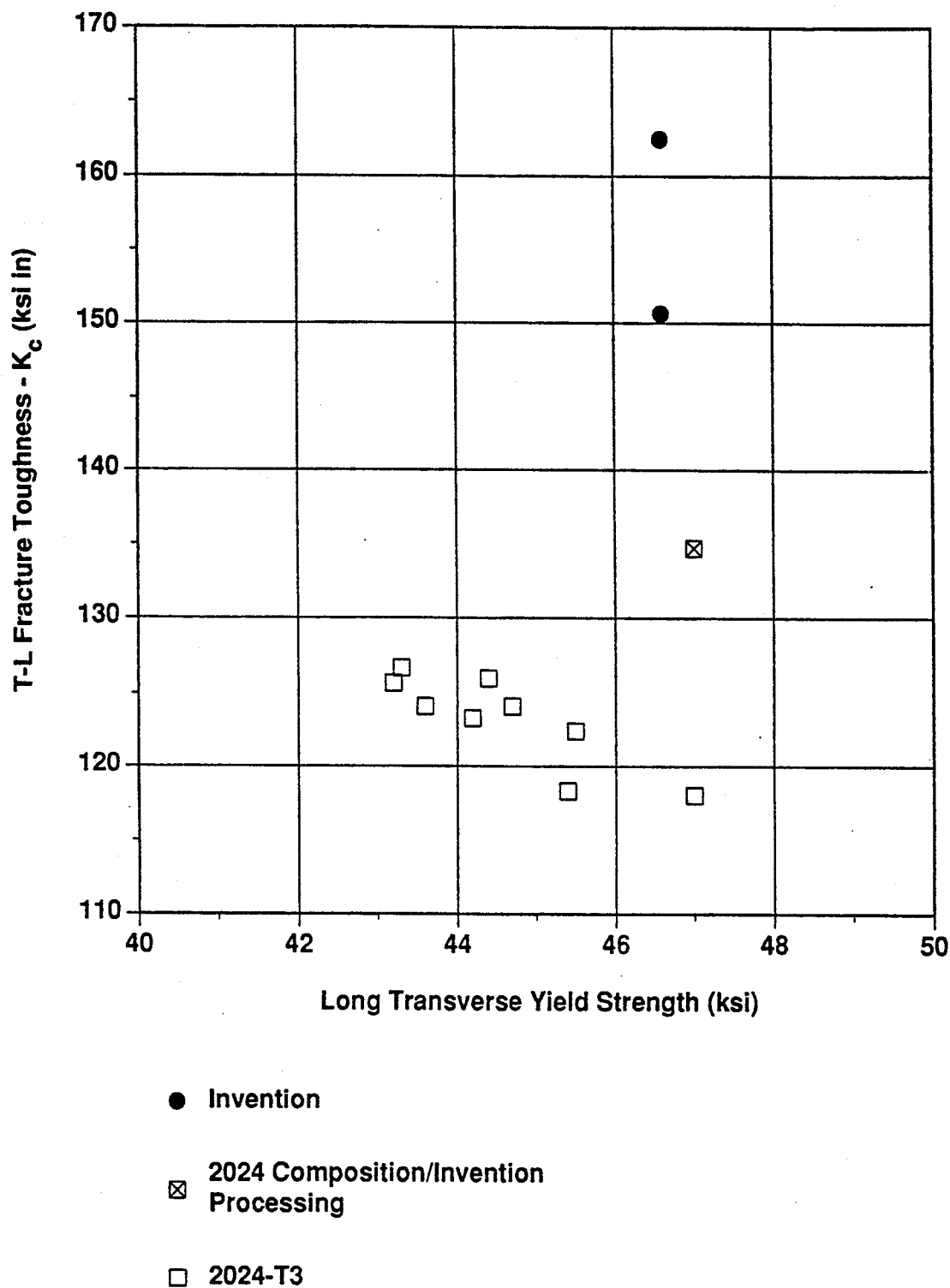
FIG. 1 shows fracture toughness $K_c$ and yield strength data for improved material and for 2024.

Typically, the alloy of the present invention preferably comprises about 3.8 or 3.9 or 4 to 4.5% Cu, 1.2 or 1.3 to 1.5 or 1.6% Mg, 0.4 to 0.8% Mn, 0.01 or 0.02 to 0.1 or 0.15% Fe, 0.01 or 0.02 to 0.1 or 0.15% Si, the balance aluminum, incidental elements and impurities. Unless indicated otherwise, all percentages for alloy elements herein are weight percent.

A preferred alloy would contain about 4.1 to 4.4% Cu, about 1.2 to 1.45% Mg, about 0.4 to 0.7% Mn, Fe not exceeding about 0.1 or 0.15%, for instance about 0.01 or 0.02 to 0.12 or 0.15% Fe, Si not exceeding about 0.1 or 0.15% maximum, for instance about 0.01 or 0.02 to 0.1 or 0.12% Si, the balance essentially aluminum, incidental elements and impurities. Impurity element Zn preferably has a maximum of 0.2 or 0.25% and Cr a maximum of 0.1 or possibly 0.2%. Zr could be added up to 0.5% Zr, with a range for Zr being 0.05 to 0.15 or 0.2 or 0.25%, such as if it is desired to make an unrecrystallized product such as a product wherein no more than 20 or 25 vol. % of the product is recrystallized. At levels of Zr above about 0.12%, coarse primary Zr-bearing particles might be formed in casting and these can be detrimental to toughness, unless care is taken to avoid such. Impurities are preferably limited to 0.05% each and the combination of impurities preferably should not exceed 0.15%. The sum total of incidental elements and impurities preferably does not exceed 0.25%, although in some cases incidental elements such as V, Hf, Cr, Ag or Sc can be included in amounts of up to about 0.5 or 1%, for instance 0.05 to 0.1 or 0.2%. A typical alloy composition would contain about 4.25% Cu, 1.35% Mg, 0.5% Mn, 0.12% max. Fe and 0.1% max. Si with Fe plus Si not totaling more than 0.20 and preferably not more than 0.15.

Mn contributes to or aids in grain size control during operations that can cause the metal to recrystallize. Very large grains are detrimental to properties such as fracture toughness, formability and corrosion resistance.

Fe and Si are normally considered impurities in aluminum and in practicing the invention their levels are preferably kept relatively low to limit formation of the constituent phases Al$_7$Cu$_2$Fe and Mg$_2$Si which are detrimental to fracture toughness and fatigue crack growth resistance. These phases have low solid solubility in Al-alloy and once formed cannot be eliminated by thermal treatments. Formation of Al$_7$Cu$_2$Fe and Mg$_2$Si phases can also lower the strength of the product because their formation reduces the amount of Cu and Mg available to form strengthening precipitates. A decrease in Fe and Si increases toughness and resistance to fatigue crack growth. Thus, in the present invention, it is preferred to control Fe to below 0.1 or 0.15% and Si to below 0.1 or 0.15%, at least where large direct chill (DC) casting is used to make the alloy ingot. Spray casting or other ingot producing techniques may make higher amounts of Fe and Si more tolerable such as 0.2% or 0.3% or 0.4% Fe or Si, or even 0.5% of each.

Preferably, Cu and Mg are carefully controlled to maintain good strength while providing the benefits in toughness and fatigue. The Cu and Mg levels should be low enough to allow for dissolution of the slightly soluble Al$_2$CuMg and Al$_2$Cu constituent phases during high temperature processing yet high enough to increase or maximize the amount of free Cu and Mg available to adequately strengthen the alloy.

The following equations may be used to estimate the "free Cu" and "free Mg"; that is, the amount of Cu and Mg that are available to form strengthening phases.

$$Cu_{Free} = Cu_{Total} - 2.28Fe - 0.74(Mn - 0.2)$$

$$Mg_{Free} = Mg_{Total} - 1.73(Si - 0.05)$$

As well as providing the alloy product with controlled amounts of alloying elements as described herein, it is preferred that the alloy be prepared according to specific method steps in order to provide the most desirable characteristics of both strength, fracture toughness, corrosion resistance and resistance to fatigue crack growth as required, for example, for use as aircraft skins or panels. The alloy as described herein can be provided as an ingot or slab for fabrication into a suitable wrought product by casting techniques currently employed in the art for cast products with continuous casting being preferred. Slabs resulting from belt casters or roll casters also may be used. Alternately, the alloy can be spray cast into the ingot or slab wherein liquid metal drops are solidified against solidified ingot or stock.

In a broader aspect of the invention, the alloy consists essentially of about 3.8 to 4.5% Cu, 1.2 to 1.85% Mg, 0.3 to 0.78 or 0.8 or 0.9% Mn, 0.5 wt. % max. Fe, 0.5% Si, the balance aluminum, incidental elements and impurities.

The ingot or slab of the alloy of the invention may be provided with a cladding on either or both sides thereof and this composite is then processed in accordance with the invention. Such clad or composite products utilize a core of the aluminum base alloy of the invention and a cladding typically of higher purity alloy which corrosion protects the core. The cladding includes essentially unalloyed aluminum or aluminum containing not more than 0.1 or 1% of all other elements. Aluminum alloys herein designated 1XXX type refer to all Aluminum Association (AA) alloys having the number 1 as the first digit and thus include all 1000 types, 1100 types, 1200 types and 1300 types. It also is intended to encompass all other aluminum or aluminum base compositions that satisfy the AA registered composition limits for any AA alloy having 1 as the first digit in its AA designation. In general, 1XXX type aluminum or aluminum alloy can serve as the cladding. Thus, the cladding on the core may be selected from various Aluminum Association alloys such as 1060, 1045, 1100, 1200, 1230, 1135, 1235, 1435, 1145, 1345, 1250, 1350, 1170, 1175, 1180, 1185, 1285, 1188 or 1199. In addition, AA alloy 7072 containing zinc (0.8 to 1.3) can serve as the cladding and alloys such as 6003 or 6253 which contain more than 1% of alloying additions can serve as cladding. The cladding alloy is different than the core alloy and does not contain as much copper, preferably being free of substantial amounts of copper, not over 0.5 or 1%, preferably less than 0.2 or 0.3% Cu, which could interfere with corrosion protection. Other alloys could also be useful as cladding as long as they provide sufficient overall corrosion protection to the core alloy. The clad layer or layers are much thinner than the core, each constituting 1 to 15 or 20 or possibly 25% of the total composite thickness. A cladding layer more typically constitutes around 1 to 10% or so of the total composite thickness.

In addition to or in lieu of an aluminum or aluminum alloy cladding, a chemical, electrochemical or other coating or surface treatment can be used to improve corrosion resistance if desired, although cladding is presently preferred.

The alloy stock may be homogenized prior to hot working or it may be heated and directly hot rolled. If homogenization is used, it may be carried out by heating to a metal temperature in the range of 900° or 910° or 920° F. to 945° or 950° or 960° F. or, possibly as much as 1000° F., for a period of time of at least 1 hour to dissolve soluble elements and to homogenize the internal structure of the metal. It is to be understood that temperatures substantially above 945° or 950° or 960° F., for instance a temperature of 975° or 980° or 1000° F., introduce significant risk of damaging the metal and are preferably avoided. A suitable time period is about 4 hours or more in the homogenization temperature range. Normally, the soak time at the homogenizing temperature does not have to extend for more than 8 hours, however, longer times are not normally detrimental. Four to six hours at the homogenization temperature has been found to be quite suitable. A typical homogenization temperature is 920° F.

For purposes of the present invention, it can be preferred to initially hot roll a clad ingot composite without a full homogenization. Thus, the ingot can be heated to 800° or 850° to 900° or 950° F. for a short time (or to 900° to 950° F. for a longer time in the case of homogenization) and hot worked or hot rolled to provide an intermediate gauge product, typically a slab. Hot rolling is performed wherein the starting temperature for rolling is in the range of 600° to 900° F., or even possibly higher provided melting or other ingot damage is avoided. When the use of the alloy is for fuselage skins, for example, the hot rolling is typically performed on ingot or starting stock 15 to 20 or more inches thick to provide an intermediate product or slab having a thickness of about 2 or 3 to 8 inches, the typical reductions being 40 or 50 or 60% to about 80% or more.

After hot rolling, the intermediate gauge product or slab is subjected to a reheating step. This reheating step is quite important to the present invention, particularly with respect to minimizing or avoiding soluble constituent or secondary phase particles and improving fatigue crack growth resistance and fracture toughness. Thus, in the reheating step, the intermediate gauge product or hot rolled slab is heated to a temperature of at least about 900°, or possibly a lower temperature such as 895° or maybe 890° on a somewhat less preferred basis, to a temperature of about 920° or 930° F., for example, which is near or above the solvus temperature of secondary phase particles, to dissolve or partially dissolve soluble constituents that remain from casting or may have precipitated during the preceding hot rolling. Such constituent particles include Al$_2$CuMg, Al$_2$Cu, for example. The reheating has the effect of putting most of the Cu and Mg into solid solution. The heating can be in the range of 900° to 945° F., or possibly 950° or possibly as much as 960° F., with a preferred range being 900° or 910° to 930° F. or 940° F. It is repeated that temperatures substantially above 945° or 950° F. introduce risk of damaging the metal and decreasing the advantages achieved in practicing the invention, it being added that the reheating operation is even less tolerant of excessive temperature than homogenization or heating before the first hot rolling. A reheating temperature of 975° or 980° F. could damage the metal because non-equilibrium eutectic melting would initiate or occur. Hence, such excessive temperatures are preferably avoided in practicing the invention, especially in both the reheat step and in subsequent operations such as solution heat treating where maximum temperatures are preferably limited to about 950° or 955° F., and more preferably, do not exceed 940° or 945° F., better yet not over 935° F., especially for metal which is derived from large DC cast ingots which can contain pockets having richer concentrations of alloying elements such as copper, a condition which might be relieved some by spray casting or other ingot production techniques. In the reheating operation, the intermediate gauge product can be held for about 20 minutes (or possibly 10 minutes) or one half or 1 hour to about 40 hours when the metal is in the aforesaid temperature range or near or above the solvus temperature for the soluble elements or phases. Preferably, times at said metal temperature of 900° F. or more are more than 2 hours, for instance in the range of 3 or more, preferably 4 hours or more to about 24 hours for metal derived from DC casting. It is important that the reheat is carefully controlled within the parameters set forth. If the reheating operation is substantially lower than 900° F., for example, 850° F., this can leave large volumes of coarse undissolved Al$_2$CuMg and Al$_2$Cu particles, for example, which particles can have an adverse effect on the fatigue crack growth resistance in the final product. In fact, if the reheat is below the solvus temperature, these particles can even grow in size. The presence of such particles can limit crack propagation resistance in the final sheet product.

In clad products, the temperature and duration of the reheat is very important for another reason. If the reheat temperature is excessive or if the time at reheat temperature is excessive, copper can diffuse into the higher purity aluminum cladding. This diffusion can detrimentally affect the corrosion protection afforded by the cladding. The present invention serves to both increase the dissolution of the deleterious constituent particles and yet avoid excessive high temperature thermal exposure times that can cause copper diffusion into the cladding, or at least keep diffusion within acceptable levels.

After the reheat, the intermediate product or slab is subjected to a second hot rolling operation. The second hot rolling operation is performed in the temperature range of about ° 500to 900° F., preferably 600° to 850° F. In general, this is effected by moving the metal from the reheating furnace to the rolling station without the need for a separate cooling operation which could even be harmful if it involved substantial times at temperatures within 800° or 820° to 870° or 880° F. The hot rolling may be performed to a final gauge, e.g., 0.5 inch or less. Alternatively, the hot rolling step can be performed to provide a second intermediate product, typically sheet, having a thickness in the range of 0.1 to 0.25 or 0.3 inch or more. Thereafter, the second intermediate product can be cold rolled to a final gauge typically in the range of 0.01 or 0.05 to about 0.2 inch, but possibly up to about one-half inch, to produce a substantially or largely recrystallized product. An intermediate anneal may be used before cold rolling, if desired. Alternatively the product can be hot rolled to a final thickness of 0.1 or 0.2 or 0.3 inch or up to about ½ inch or a little more such as up to around ⅝ inch without cold rolling.

Even though hot rolling can proceed within 600° to 900° F., once the reheat step is performed effort preferably should be made to avoid prolonged exposure to temperatures substantially above 700° or 750° F. and substantially below around 900°, for instance temperatures around 850° or even 800° F. should be avoided for prolonged exposures although the relatively brief exposures encountered in hot rolling are not considered excessive. Such temperatures (for instance around 800° or 825° to 875° F. or so), if encountered for substantial time, result in lowered toughness and higher fatigue crack growth rate. Hence, the practice of the invention preferably includes measures consistent with plant practicalities and economics to avoid substantial time exposures (for example exceeding about 3 to 1 hour) at temperatures of about 780° or 800° or more to 870° or so, after the aforesaid reheating step (at 900° or 910° to about 945° or 950° F.) used in practicing the invention.

After rolling, the sheet product is subjected to a solution heat treatment preferably in the range of about 900° or 910° to 945° or 950° F., more preferably 905° to 935° or 940° F. It can be important that the solution heat treatment be carefully controlled in duration. Thus, the solution heat treatment can be accomplished in 5 minutes or even less when the metal has reached the solution temperature. The time can be extended to 15 minutes or even 60 minutes or possibly longer especially with a non-clad product. However, in clad product, care should be taken against diffusion of copper into the cladding and possible problems resulting therefrom and shorter times favor less diffusion.

Solution heat treatment in accordance with the present invention may be performed on a continuous basis. Basically, solution effects can occur fairly rapidly. In continuous treating, the sheet is passed continuously as a single web through an elongated furnace which greatly increases the heat-up rate. Long solution heat treat times may be used to dissolve the soluble constituents such as $Al_2CuMg$ and $Al_2Cu$. However, long time (more than 1 hour or 2 hours) solution heat treatments should not be used on clad products because of the excessive Cu diffusion that can occur in the cladding. The continuous approach facilitates practice of the invention since a relatively rapid heat-up and short dwell time at solution temperature result in minimizing copper diffusion into the cladding. Accordingly, solution heat treating in as little as about 10 minutes, or less, for instance about 0.5 to 4 minutes, are useful in practicing the invention, especially for thin members with thin cladding. As a further aid to achieving a short heat-up time, a furnace temperature or a furnace zone temperature significantly above the desired metal temperatures provides a greater temperature head useful to speed heat-up times.

After solution heat treatment, it is important that the metal be rapidly cooled, or quenched, to prevent or minimize the uncontrolled precipitation of secondary phases, e.g., $Al_2CuMg$ and $Al_2Cu$. Thus, it is preferred in the practice of the invention that the quench rate be at least 100° F./sec from solution temperature to a temperature of 350° F. or lower. A preferred quench rate is at least 300° F./sec in the temperature range of 925° F. or more to 350° F. or less. Suitable rates can be achieved with the use of water, e.g., water immersion or water jets. Further, air or air jets may be employed.

After quenching, the sheet may be cold worked, for example, by stretching or cold rolling, or both, by up to about 10% of its original length. Typically, cold or other working may be employed which produces a working effect similar to (or substantially, i.e. approximately, equivalent to) that which would be imparted by stretching at room temperature in the range of about ½% or 1% or 1½% to 2% or up to 4 or 6% or 8% of the products' original length. Stretching or other cold working such as cold rolling about 2 or 3 to 9 or 10%, preferably about 4 or 5% to about 7 or 8%, can improve strength while retaining good toughness. Yield strength can be increased around 10 ksi, for instance to levels as high as around 59 or 60 ksi or more without excessively degrading toughness, even actually increasing toughness by 5 or 6 ksi√in ($K_c$ in L-T orientation), in one test by stretching 6 or 7%. The invention in heavy sheet form, for instance, about 0.2 or 0.25 inch thick, can be stretched 6 or 7% with relative ease and gain about 10 ksi strength along with a toughness gain of about 5 or so ksi√in, or at least no degradation in toughness, or an acceptable relatively small degradation in toughness, the strength gain being significant. Cold working before aging is easier because the metal is weaker but can encounter Leuder's lines if stretching is used. Cold working after significant aging effect (for instance, a significant strength increase) requires more power because the metal is stronger but involves less likelihood of Leuder's lines or the like.

After rapidly quenching, and cold working if desired, the sheet product is aged, preferably naturally aged. By natural aging is meant to include aging at room temperature, for instance 75° F. or so, or 70° to 80° F. or so, and temperatures up to around 175° F. or 200° F. Aging at room temperature (75° F.) reaches 90% or so of its practical naturally aged strength potential within about 24 or 30 hours or so. If cold work is employed, it can precede natural aging or follow some amount thereof as stated above. Artificial aging practices which do not excessively reduce fracture toughness or fatigue crack growth resistance could also be used. For instance, aging at around 200° to 215° or 220° F. or so for 12 to 8 hours or so, or at around 280° to 300° F. or so for around an hour or so could be suitable. However, excessive combination of aging time and temperature could increase strength at an excessive penalty in toughness or fatigue resistance, or both.

If artificial aging is employed, it is believed such could be combined with a forming or shaping operation. Such age forming using a load at elevated artificial aging temperature to bend or otherwise plastically form a shaped or partially shaped product is believed to be useful in practicing the invention although excessive aging time or temperature should be avoided as stated just above. Accordingly, the invention includes combining forming and artificial aging although the toughness and fatigue crack growth rate properties could be diminished some by such. Nonetheless, it is believed that the invention products would substantially outperform age formed 2024 products with respect to the property combinations discussed herein, good combinations of strength, along with toughness or fatigue crack growth resistance, or both.

The improved product could be provided to a user in a non-solution heat treated condition, such as annealed "0" temper, and then formed and solution heat treated and aged by the user.

Conforming to these controls and using the alloy composition of the invention greatly aids the production of sheet stock having high yield strength, similar to 2024 in T3 temper, along with substantially improved levels of fracture toughness and increased resistance to fatigue crack growth and high resistance to corrosion. The above-described controls for heating and rolling impart a substantial improvement in combination with the herein-described composition controls. That is, sheet can be produced having a minimum long transverse yield strength of about 37 or 38 ksi or 39 or 40 or 42 ksi, for instance about 43 or 44 ksi or 45 or 46 or 47 ksi, along with good minimum (guaranteeable) $K_c$ fracture toughness or good maximum (guaranteeable) fatigue crack growth rate, or both. A long transverse yield strength over 55 ksi can be achieved if the product is cold worked, such as by stretching, after quenching. Minimum yield strength could increase to 50 ksi or more, for instance 52 or 54 ksi or more, if cold working is used after quenching.

When referring to a minimum (for instance for strength or toughness) or to a maximum (for instance for fatigue crack growth rate), such refers to a level at which specifications for materials can be written or a level at which a material can be guaranteed or a level that an airframe builder (subject to safety factor) can rely on in design. In some cases, it can have a statistical basis wherein 99% of the product conforms or is expected to conform with 95% confidence using standard statistical methods.

Figure 2:
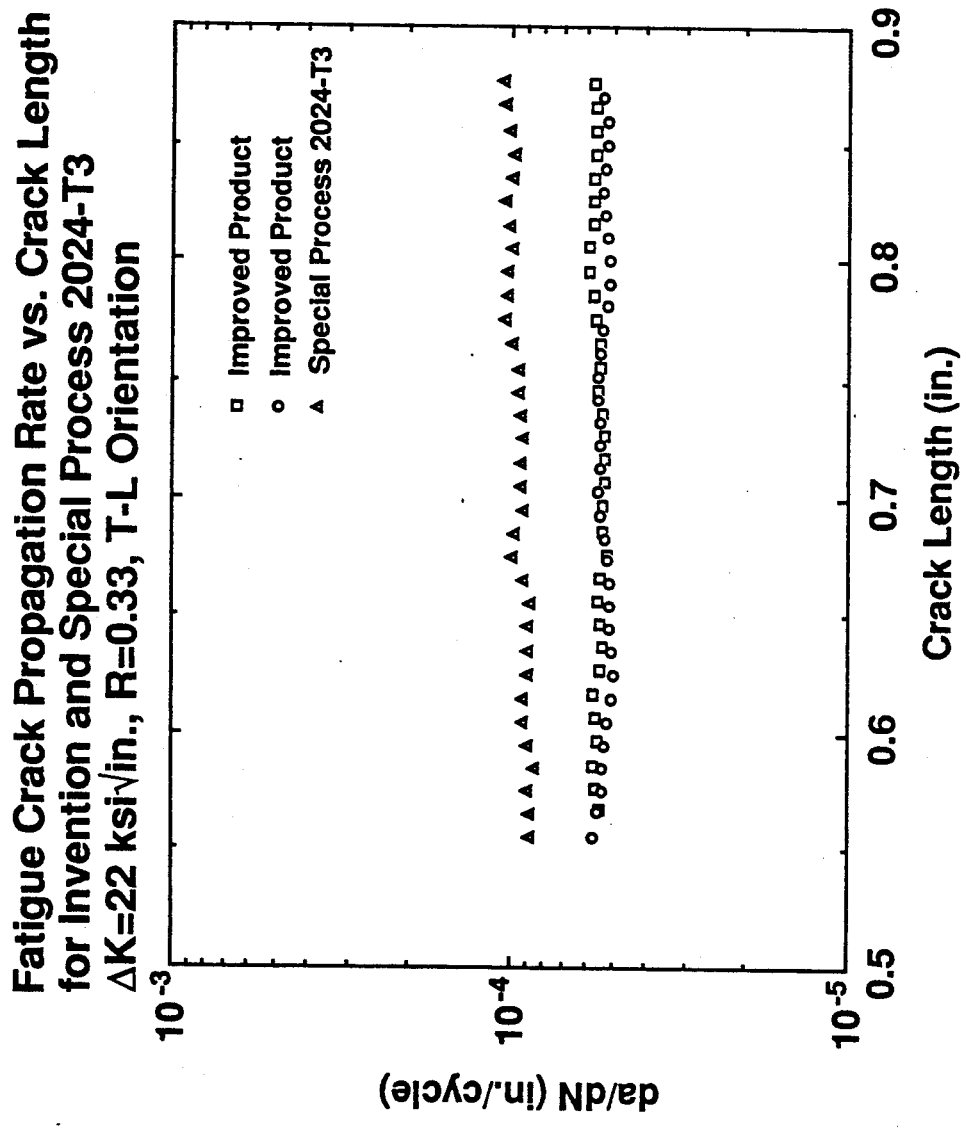
FIG. 2 is a graph showing fatigue crack growth rate data versus crack length for specially processed 2024 in the solution heat treated, cold worked and naturally aged T3 temper and for the improved product in accordance with the invention.

FIGS. 1 and 2 illustrate the extent of improvement in $K_c$ toughness (FIG. 1) and fatigue crack growth rate (FIG. 2) of the invention over 2024 type alloy in T3 temper. Alloy 2024 is the present fuselage alloy for airliners. FIG. 1 includes a point (X within square) showing 2024 that had been processed according to the process of the invention. FIG. 2 shows the invention product versus 2024 that had been processed according to the invention method which enhanced its fatigue performance somewhat. The extent of the improvement for the invention is pronounced, even over 2024 that had been subjected to improved processing in accordance with the invention.

Fracture toughness is an important property to airframe designers, particularly if good toughness can be combined with good strength. By way of comparison, the tensile strength, or ability to sustain load without fracturing, of a structural component under a tensile load can be defined as the load divided by the area of the smallest section of the component perpendicular to the tensile load (net section stress). For a simple, straight-sided structure, the strength of the section is readily related to the breaking or tensile strength of a smooth tensile coupon. This is how tension testing is done. However, for a structure containing a crack or crack-like defect, the strength of a structural component depends on the length of the crack, the geometry of the structural component, and a property of the material known as the fracture toughness. Fracture toughness can be thought of as the resistance of a material to the harmful or even catastrophic propagation of a crack under a tensile load.

Fracture toughness can be measured in several ways. One way is to load in tension a test coupon containing a crack. The load required to fracture the test coupon divided by its net section area (the cross-sectional area less the area containing the crack) is known as the residual strength with units of thousands of pounds force per unit area (ksi). When the strength of the material as well as the specimen are constant, the residual strength is a measure of the fracture toughness of the material. Because it is so dependent on strength and geometry, residual strength is usually used as a measure of fracture toughness when other methods are not as useful because of some constraint like size or shape of the available material.

When the geometry of a structural component is such that it doesn't deform plastically through the thickness when a tension load is applied (plane-strain deformation), fracture toughness is often measured as plane-strain fracture toughness, $K_{Ic}$. This normally applies to relatively thick products or sections, for instance 0.6 or 0.75 or 1 inch or more. The ASTM has established a standard test using a fatigue pre-cracked compact tension specimen to measure $K_{Ic}$ which has the units ksi$\sqrt{}$in. This test is usually used to measure fracture toughness when the material is thick because it is believed to be independent of specimen geometry as long as appropriate standards for width, crack length and thickness are met. The symbol K, as used in $K_{Ic}$, is referred to as the stress intensity factor. A narrower test specimen width is sometimes used for thick sections and a wider test specimen width for thinner products.

Structural components which deform by plane-strain are relatively thick as indicated above. Thinner structural components (less than 0.6 to 0.75 inch thick) usually deform under plane stress or more usually under a mixed mode condition. Measuring fracture toughness under this condition can introduce variables because the number which results from the test depends to some extent on the geometry of the test coupon. One test method is to apply a continuously increasing load to a rectangular test coupon containing a crack. A plot of stress intensity versus crack extension known as an R-curve (crack resistance curve) can be obtained this way. The load at a particular amount of crack extension based on a 25% secant offset in the load vs. crack extension curve and the crack length at that load are used to calculate a measure of fracture toughness known as $K_{R25}$. It also has the units of ksi$\sqrt{}$in. ASTM E561 (incorporated by reference) concerns R-curve determination.

When the geometry of the alloy product or structural component is such that it permits deformation plastically through its thickness when a tension load is applied, fracture toughness is often measured as plane-stress fracture toughness. The fracture toughness measure uses the maximum load generated on a relatively thin, wide pre-cracked specimen. When the crack length at the maximum load is used to calculate the stress-intensity factor at that load, the stress-intensity factor is referred to as plane-stress fracture toughness $K_c$. When the stress-intensity factor is calculated using the crack length before the load is applied, however, the result of the calculation is known as the apparent fracture toughness, $K_{app}$, of the material. Because the crack length in the calculation of $K_c$ is usually longer, values for $K_c$ are usually higher than $K_{app}$ for a given material. Both of these measures of fracture toughness are expressed in the units ksi$\sqrt{}$in. For tough materials, the numerical values generated by such tests generally increase as the width of the specimen increases or its thickness decreases.

Plane-stress fracture toughness can be determined from a center cracked tension test. In this test, sheet in accordance with the invention exhibits a minimum $K_{app}$ of about 80 to 85 ksi$\sqrt{}$in, preferably 85 to 90 or 95 or more, even 100 or more, ksi$\sqrt{}$in (that is, 80 or more up to 100 or more ksi$\sqrt{}$in) when tested with an approximately 16-inch wide test specimen, and a minimum $K_c$ within about 140 to 145, preferably within about 150 to 160 ksi$\sqrt{}$in or more, even 165 or more (that is, 140 or more up to 165 or more ksi$\sqrt{}$in). It is to be appreciated that the width of the test panel used in a toughness test can have a substantial influence on the stress intensity measured in the test. A given material may exhibit a $K_{app}$ toughness of 60 ksi$\sqrt{}$in using a 6-inch wide test specimen, whereas for wider specimens the measured $K_{app}$ will increase with wider and wider specimens. For instance, the same material that had a 60 ksi$\sqrt{}$in $K_{app}$ toughness with a 6-inch panel could exhibit a higher $K_{app}$, for instance arund 90 ksi$\sqrt{}$in, in a 16-inch panel and still higher $K_{app}$, for instance around 150 ksi$\sqrt{}$in, in a 48-inch wide panel test and a still higher $K_{app}$, for instance around 180 ksi$\sqrt{}$in, with a 60-inch wide panel test specimen. Accordingly, in referring to K values for toughness tests herein, unless indicated otherwise, such refers to testing with a 16-inch wide panel. However, those skilled in the art recognize that test results can vary depending on the test panel width and it is intended to encompass all such tests in referring to toughness. Hence, toughness substantially equivalent to or substantially corresponding to a minimum value for $K_c$ or $K_{app}$ in characterizing the invention products, while largely referring to a test with a 16-inch panel, is intended to embrace variations in $K_c$ or $K_{app}$ encountered in using different width panels as those skilled in the art will appreciate. It should be noted that toughness of prior commercially produced 2024-T3 alloy was not normally guaranteed or even routinely required to be tested; however, typical $K_c$ values (from 16" wide specimen) for conventional 2024-T3 are generally about 125 ksi$\sqrt{}$in, but $K_c$ values (T-L orientation) as low as 115 ksi$\sqrt{}$in and even below 110 ksi$\sqrt{}$in have been measured, all of which are well below 140 to 165 ksi or more for the minimum $K_c$ for the invention product. Typical $K_{app}$ values for 2024 using 16-inch wide test specimens are in the 70's (ksi$\sqrt{}$in) or possibly higher, but well below the levels reached with the invention. The plane-stress fracture toughness ($K_{app}$) test applies to all thicknesses of products but may in some applications find more use in thinner products such as 1 inch or ¾ inch or less in thickness, for example, ⅜ inch or ¼ inch or less in thickness. The specimens for the immediately preceding tests are usually in the T-L orientation (specimen length perpendicular to rolling direction and crack parallel to the rolling direction). The testing typically is in accordance with ASTM E561 and ASTM B646 (both incorporated herein by reference).

The toughness of the improved products according to the invention is so high that it allows the aircraft designer's focus for a material's damage tolerance to switch some from toughness measurement to fatigue crack growth rate which, in its own right, is an important property. Resistance to cracking by fatigue is a very desirable property. The fatigue cracking referred to occurs as a result of repeated loading and unloading cycles, or cycling between a high and a low load such as when a wing moves up and down or a fuselage swells with pressurization and contracts with depressurization. The loads during fatigue are below the static ultimate or tensile strength of the material measured in a tensile test and they are typically below the yield strength of the material. If a crack or crack-like defect exists in a structure, repeated cyclic or fatigue loading can cause the crack to grow. This is referred to as fatigue crack propagation. Propagation of a crack by fatigue may lead to a crack large enough to propagate catastrophically when the combination of crack size and loads are sufficient to exceed the material's fracture toughness. Thus, an increase in the resistance of a material to crack propagation by fatigue offers substantial benefits to aerostructure longevity. The slower a crack propagates, the better. A rapidly propagating crack in an airplane structural member can lead to catastrophic failure without adequate time for detection, whereas a slowly propagating crack allows time for detection and corrective action or repair.

The rate at which a crack in a material propagates during cyclic loading is influenced by the length of the crack. Another important factor is the difference between the maximum and the minimum loads between which the structure is cycled. One measurement including the effects of crack length and the difference between maximum and minimum loads is called the cyclic stress intensity factor range or $\Delta K$, having units of ksi-$\sqrt{}$in, similar to the stress intensity factor used to measure fracture toughness. The stress intensity factor range ($\Delta K$) is the difference between the stress intensity factors at the maximum and minimum loads. Another measure affecting fatigue crack propagation is the ratio between the minimum and the maximum loads during cycling, and this is called the stress ratio and is denoted by R, a ratio of 0.1 meaning that the maximum load is 10 times the minimum load.

Figure 2A:
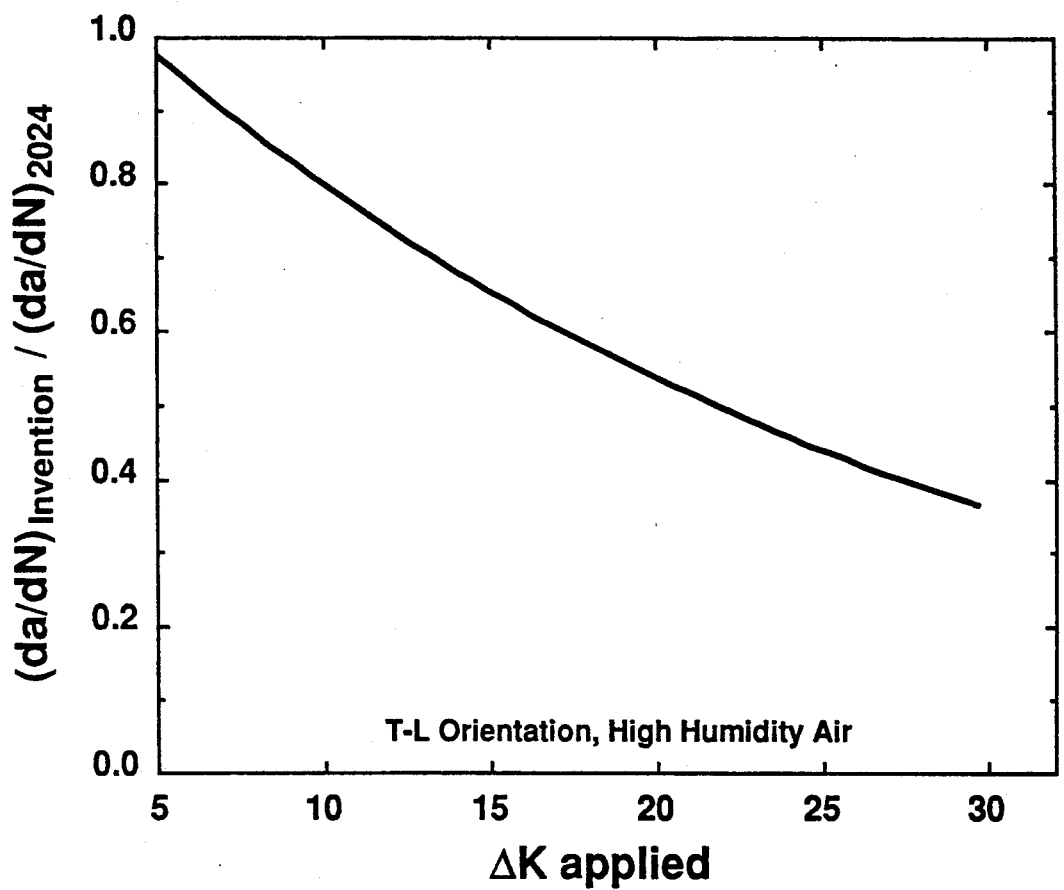
FIG. 2a is a plot of the ratio of the fatigue crack growth rate for the improvement divided by that for 2024 versus $\Delta K$.

The fatigue crack propagation rate can be measured for a material using a test coupon containing a crack. One such test specimen or coupon is about 12 inches long by 4 inches wide having a notch in its center extending in a cross-wise direction (across the width; normal to the length). The notch is about 0.032 inch wide and about 0.2 inch long including a 60° bevel at each end of the slot. The test coupon is subjected to cyclic loading and the crack grows at the end(s) of the notch. After the crack reaches a predetermined length, the length of the crack is measured periodically. The crack growth rate can be calculated for a given increment of crack extension by dividing the change in crack length (called $\Delta a$) by the number of loading cycles ($\Delta N$) which resulted in that amount of crack growth. The crack propagation rate is represented by $\Delta a/\Delta N$ or 'da/dN' and has units of inches/cycle. The fatigue crack propagation rates of a material can be determined from a center cracked tension panel. The fatigue crack propagation rates for sheet in accordance with the invention are much slower than the prior 2024-T3 alloy sheet made by standard production methods when measured using a center cracked tension panel and tested at cyclic stress intensity factors of $\Delta K$ greater than 5 ksi-$\sqrt{}$in. FIG. 2a shows the fraction obtained by dividing the fatigue crack propagation rate of sheet according to the invention by the fatigue crack propagation rate of 2024-T3 alloy sheet, which fraction is plotted versus the cyclic stress intensity factor range, $\Delta K$. In FIG. 2a, a ratio of 1 indicates equal fatigue crack growth rate whereas a ratio of 0.5 indicates much superior performance (half the crack growth rate, or twice as good). The data show that the fatigue crack propagation rates of the invention product sheet are dramatically reduced when compared to 2024-T3 sheet especially at higher values of $\Delta K$. For example, at $\Delta K = 25$ ksi$\sqrt{}$in, the fatigue crack propagation rate of the sheet according to the invention is less than one half of the crack propagation rate of 2024-T3 alloy sheet. That is, a crack in 2024-T3 alloy sheet will grow more than twice as fast as a crack in the invention product sheet when subjected to loads such that the cyclic stress intensity factor range $\Delta K$ is 25 ksi$\sqrt{}$in. At $\Delta K=30$ ksi$\sqrt{}$in, the fatigue crack growth rate for sheet according to the invention is substantially less than 40% of the crack growth rate for 2024-T3; that is, fatigue cracks in 2024 grow two-and-a-half (2½) times faster than in the invention sheet.

In a constant load amplitude test, the tensile load or pull loads for high load and low load are the same through the fatigue cycling. This causes the $\Delta K$ level in terms of stress intensity (ksi$\sqrt{}$in) to increase as the crack grows during the test. This increase becomes more rapid as the test progresses, and the precision can thereby suffer in later stages as the crack grows significantly in length.

Still another technique in testing is use of a constant $\Delta K$ gradient. In this technique, the otherwise constant amplitude load is reduced toward the latter stages of the test to slow down the rate of $\Delta K$ increase. This adds a degree of precision by slowing down the time during which the crack grows to provide more measurement precision near the end of the test when the crack tends to grow faster. This technique allows the $\Delta K$ to increase at a more constant rate than achieved in ordinary constant load amplitude testing.

Another way to measure fatigue crack propagation rate of sheet is by growing a crack at a constant level of the applied stress intensity factor range, $\Delta K$, throughout the test. The advantage of the constant $\Delta K$ test is that it provides a repeated measure of the crack growth rate at that level of $\Delta K$ for a relatively large distance of crack propagation. In this test, as the crack grows the tensile loads between which the panel is cycled need to be reduced as the test progresses to maintain a constant level of $\Delta K$. At the start of this test, an initial fatigue crack is grown from a small machined slot in the center of the panel at a low value of $\Delta K$, then the load is increased to give the desired level of $\Delta K$. When this is done, the crack propagates at an initial rate followed by a rapid decrease to a "steady state" crack propagation rate which normally is the propagation rate measured in the test. One reason for this decrease in propagation rate is believed to be the development of what is referred to as crack closure. Crack closure can occur during the unloading portion of the fatigue cycle when the crack faces come into contact with one another before the load drops to the minimum load level. Because the crack closes at a load above the minimum load, further unloading has no effect on the crack. Thus, the difference between the minimum and maximum loads which affect the crack is reduced which results in a lower effective $\Delta K$ than the intended or nominal applied $\Delta K$. As a consequence, when crack closure occurs, the crack growth rate of the material is decreased. Several causes of closure are rough fracture surfaces that do not fit back together exactly during unloading, oxide buildup on the fracture surfaces that come into contact during unloading, or material at the crack tip is stretched past the yield strength (or plastically deformed) and after the crack grows through the stretched material the crack faces come into contact during unloading because the material is stretched. The latter cause is referred to as plasticity induced closure and is the cause of the initial decrease in crack growth rate observed in the constant $\Delta K$ test. After the crack has grown for some distance at a constant $\Delta K$ the amount of crack closure becomes constant and a steady state crack growth rate results.

When the invention product sheet is tested using a 4-inch wide panel with a center crack at a constant level of the cyclic stress intensity factor range of $\Delta K=25$ ksi$\sqrt{}$in, a stress ratio of $R=+0.1$, in air with a relative humidity greater than 95%, the average steady state fatigue crack propagation rate for sheet according to the invention is $5.54 \times 10^{-5}$, while for commercial 2024-T3 sheet tested under the same conditions the average fatigue crack propagation rate is almost twice as fast at $10.6 \times 10^{-5}$. Similarly when tested at a constant cyclic stress intensity factor range of $\Delta K=30$ ksi$\sqrt{}$in and the same conditions as above, the average steady state fatigue crack propagation rate for the invention sheet is $9.55 \times 10^{-5}$ and for 2024-T3 sheet the average fatigue crack propagation rate is more than twice as fast $21.4 \times 10^{-5}$. At $\Delta K$ of about 22 ksi$\sqrt{}$in, the sheet according to the invention had an average steady state fatigue crack propagation rate of $5 \times 10^{-5}$ which was around half that for commercial 2024-T3 sheet. The specimens for the immediately preceding tests are usually in the T-L orientation. The testing is in accordance with ASTM E647-88, the entire content of which is incorporated herein by reference.

As shown in FIG. 2, the new product has very good resistance to fatigue crack propagation in tests conducted using a constant cyclic stress intensity factor range of 22 ksi$\sqrt{}$in. This cyclic stress intensity factor range is important for the damage tolerant design of transport airplanes such as commercial airliners, but a $\Delta K$ of 25 or 30 is also important in testing fatigue crack growth rate for aircraft application. Incidentally, in plots like FIG. 2 wherein crack length is shown on the horizontal axis and da/dN on the vertical axis, it is common for the data points on the extreme left (near the vertical axis) representing the rate at the early stage of testing to be higher than the steady state data shown in FIG. 2. The steady state data is often that of more importance.

Example 1

This example includes two parts. In Part 1, a 16×60 inch ingot containing, in accordance with the invention, 4.28% Cu, 1.38% Mg, 0.50% Mn, 0.07% Fe, 0.05% Si, balance Al was cast. The metal was clad with AA1145 then heated to approximately 875° F. and hot rolled to a slab gauge of 4.5 inches. The rolled slab was then heated to a temperature above 910° F. for 17 hours and hot rolled to a gauge of 0.176 inch. The metal was cold rolled to a final gauge of 0.100 inch before solution heat treating for 10 minutes at 925° F., quenched by cold water sprays, and stretched around 2%. The sheet was aged for 3 weeks at room temperature.

In Part 2, for comparison, an alloy with 2024 composition, 2024 being the alloy currently used for the fuselage skins of commercial jet airliners, having the approximate composition 4.6% Cu, 1.5% Mg, 0.6% Mn, 0.2% Fe, 0.1% Si, balance Al (actual composition: 4.54% Cu, 1.52% Mg, 0.64% Mn, 0.17% Fe, 0.08% Si), was processed essentially the same. It is to be noted that the 2024 comparison product does not represent typical commercial 2024 because the comparison product received processing according to the invention.

The product of the invention had a 16% higher plane stress fracture toughness ($K_c=156.5$ ksi$\sqrt{}$in average for 2 measurements of new product data of FIG. 1 versus 134.7 ksi$\sqrt{}$in for the comparison special processed 2024 T-3 point of FIG. 1), and even greater improvement (around 25%) over normal 2024. Fatigue cracks for the invention product at a cyclic stress intensity range of 22 ksi$\sqrt{}$in grew more than 44% slower (da/dN = $5.3 \times 10^{-5}$ in/cycle versus $9.52 \times 10^{-5}$ in/cycle, $$\frac{9.52 - 5.3}{9.52} = 44.33\%$$

as shown in the table below as compared to 2024 alloy even as processed according to the invention method to have better performance.

TABLE I

Fatigue Crack Propagation at Different Cyclic Stress Intensity Ranges

| Sample | ΔK | da/dN |
| --- | --- | --- |
| New Product | 10 | $6.70 \times 10^{-6}$ |
|  | 22 | $5.30 \times 10^{-5}$ |
|  | 30 | $1.34 \times 10^{-4}$ |
| Specially | 10 | $7.91 \times 10^{-6}$ |
| processed | 22 | $9.52 \times 10^{-5}$ |
| 2024-T3 | 30 | $3.71 \times 10^{-4}$ |

ΔK = Cyclic Stress Intensity Factor Range
da/dN = Length of crack growth during one load/unload cycle Test performed with an R-ratio (min. load/max. load) equal to 0.33.

Fracture toughness was measured using a 16-inch wide, 44-inch long panel. All values given were taken in the T-L orientation which means that the applied load was parallel to the transverse direction of the sheet and the crack propagated parallel to the longitudinal direction of the sheet. Fatigue crack growth resistance was measured as the length a crack propagates during each cycle at a given stress intensity range. The measurements were made with an R-ratio of 0.33 in the T-L orientation. It is readily seen that as the stress intensity factor increases, the extent of the improvement becomes more prominent.

Figure 3:
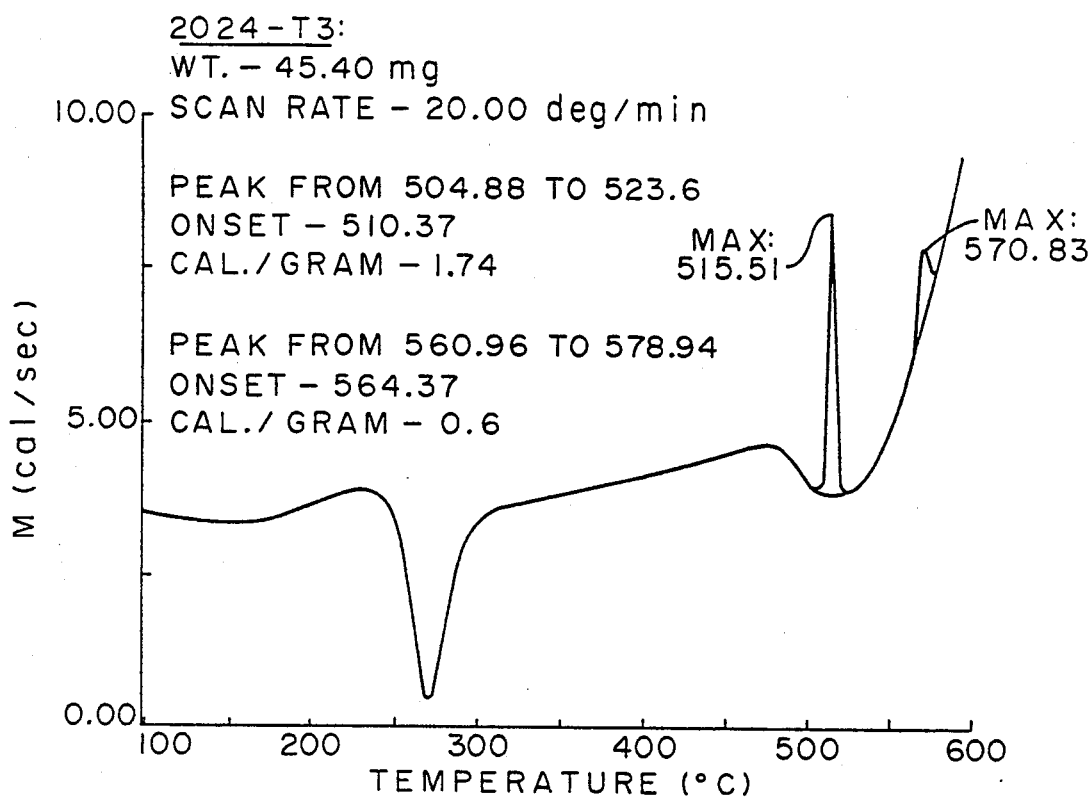
FIG. 3 is a differential scanning calorimetry curve of 2024-T3.
Figure 4:
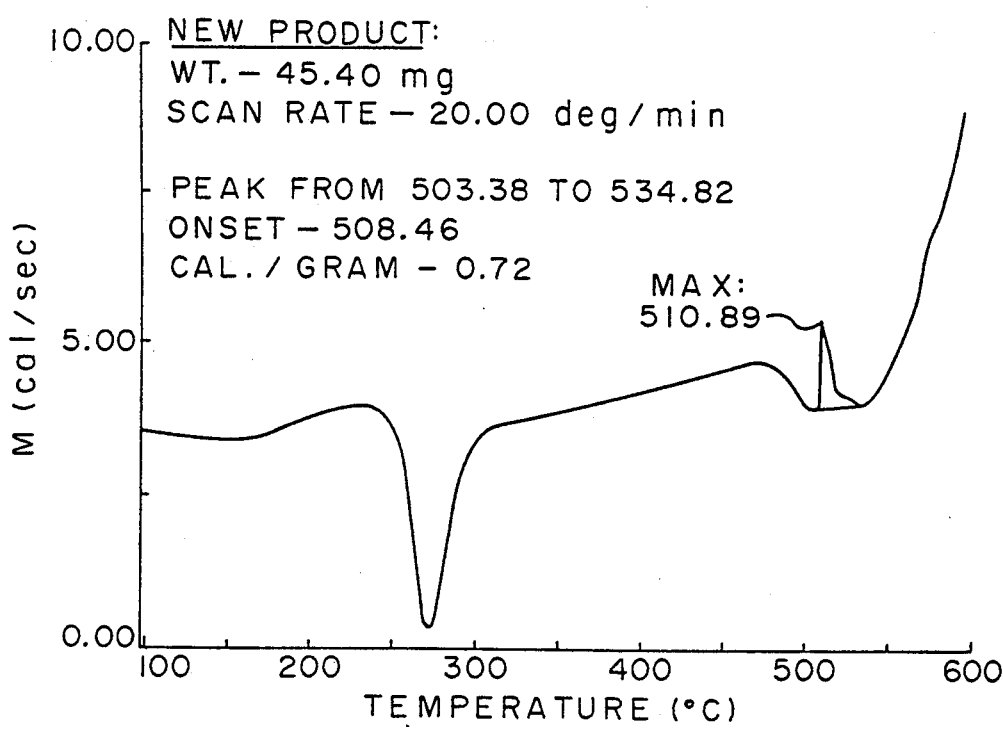
FIG. 4 is a differential scanning calorimetry curve of an aluminum alloy product in accordance with the invention.

One possible explanation of part of the metallurgical causes of the improvement can be seen in FIGS. 3 and 4 which show differential scanning calorimetry curves. Differential scanning calometry offers a way to characterize the amount of coarse $Al_2CuMg$ and $Al_2Cu$ constituent particles. Because the eutectic is comprised of these phases with aluminum melts between 500° and 580° C., the energy associated with the melting reaction is related to the volume fraction of the particles. Prior alloy 2024 products typically exhibit a value greater than 2.2 calories/gram for the energy of fusion associated with melting three phases. Sheet material of the invention generally has a 500° to 580° C. differential scanning calorimetry peak of less than 1.0 cal/gram. FIGS. 3 and 4 show a comparison between the new product and 2024-T3 (which is the current material of choice for the fuselage skins of commercial jet aircraft) except that this particular 2024-T3 had been processed by special processing according to the invention which improved it over ordinary 2024.

Referring again to FIGS. 3 and 4 the size of the sharp peak that occurs in the temperature range of 500° to 530° C. (FIG. 3) is indicative of the amount of constituent phase or phases such as $Al_2CuMg$ and $Al_2Cu$ present. These phases are believed to contribute to the lowering of a material's fracture toughness and its resistance to fatigue crack growth. The new product (FIG. 4) has a much smaller peak indicating that the volume fraction of such constituent has been significantly reduced in accordance with the present invention.

Sheet material of the invention is preferably characterized by a substantial absence or sparsity of secondary phase particles, e.g., $Al_7Cu_2Fe$, $Al_6(Fe, Mn)$ $Al_2CuMg$ and $Al_2Cu$ particles. That is, sheet material of the invention has generally not more than about 1.5 vol. %, preferably not more than 1.25 vol. %, of such particles larger than 0.15 square μm as measured by optical image analysis through a cross section of the product.

The volume fraction of total large constituent phase particles (including Fe and Si bearing particles), e.g., larger than 0.15 square μm, was much smaller for the new product than for the conventionally treated 2024-T3. In twelve measurements, the new product volume fraction ranged from 0.756% to 1.056%. In twelve measurements, the specially treated 2024-T3 constituent volume fraction ranged from 1.429% to 2.185%.

EXAMPLE 2

This example includes four parts.

In Part 1 (see Example 1, Part 1, the Example 1 processing being repeated for reading convenience), a 16-inch thick by 60-inch wide ingot in accordance with the invention containing 4.28% Cu, 1.38% Mg, 0.50% Mn, 0.07% Fe, 0.05% Si, balance Al, was cast. The metal was clad with alloy 1145 then preheated to approximately 875° F. and hot rolled to a slab gauge of 4.5 inches. The slab was then reheated to a temperature above 910° F. for 17 hours and hot rolled to a gauge of 0.176 inch. The metal was cold rolled to a final gauge of 0.1 inch and solution heat treated for 10 minutes at 925° F., quenched and stretched around 2% in length. Then the sheet was naturally aged for 3-weeks at room temperature. The strength, plane stress fracture toughness and resistance to fatigue crack growth of the product of this invention are listed in the table below.

In Part 2, a 16-inch thick comparision ingot having a composition in accordance with the invention and containing 4.26% Cu, 1.37% Mg, 0.51% Mn, 0.08% Fe, 0.04% Si, balance Al, was cast. The metal was clad with alloy 1145 then it was given the same processing as described above for Part 1 except the 4.5 inch hot rolled slab was reheated to about 910° or 915° F. for about 8 hours, but then held at 850° F. for another 8 hours before the second hot rolling. In its final temper, this sheet had a lower combination of strength, toughness and resistance to fatigue crack growth than the product of this invention (see the table below). Specifically, the invention had a toughness 11.2% better than this comparison and this comparison's crack growth rate was 35% faster than that for the invention.

In Part 3 (see Example 1, Part 2, the processing being repeated for convenience in reading), a comparison ingot of 2024-T3, the alloy currently used for the fuselage skins of commercial jet airliners containing 4.54% Cu, 1.52% Mg, 0.64% Mn, 0.17% Fe, 0.08% Si, balance Al, was clad with alloy 1145 then was fabricated according to the process for the new product set forth above in Part 1 of this Example. This comparison material also had a lower combination of strength, toughness and resistance to fatigue crack growth than the product of this invention (see the table below). The invention had a 16% higher $K_c$ toughness and the comparison material's crack growth rate was over 61% faster than the invention product's at ΔK=25 ksi√in $$\left(\frac{9.08 - 5.62}{5.62} = 61.56\%\right).$$

The table below also includes in Part 4 alloy 2024-T3 sheet clad with alloy 1145, the core 2024 containing 4.63% Cu, 1.58% Mg, 0.64% Mn, balance aluminum and impurities, using the standard 2024-T3 processing. The fatigue crack growth resistance and toughness of this sheet represent the typical behavior of the existing product that is currently used for fuselage skins of commercial aircraft.

Figure 5:
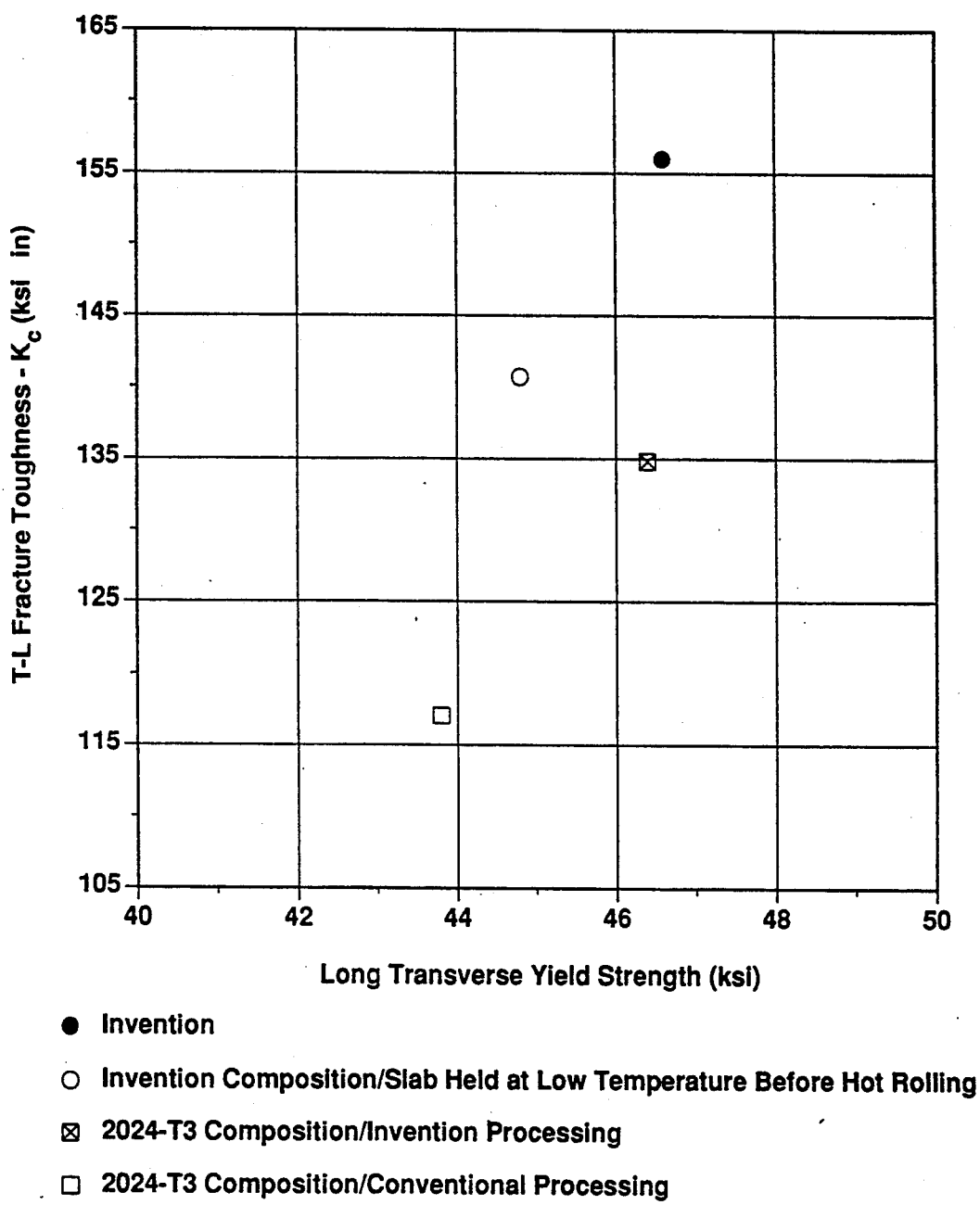
FIG. 5 shows fracture toughness and yield strength data for different sheet materials from Example 2 hereof.

These four sets of data (Parts 1 to 4) on commercial size product made from commercial size ingot emphasize how the damage-tolerant property improvements (fracture toughness and fatigue crack growth rate) can be achieved using the composition and process described in this invention. FIG. 5 illustrates strength versus toughness for Parts 1 to 4 of Example 2. Compared to 2024-T3, the product of this invention has over 33% higher T-L plane stress fracture $K_c$ toughness and the 2024 fatigue crack growth rate at a $\Delta K$ of 25 was more than twice as fast as the invention product's. This shows the new product has clearly superior damage tolerant properties over the present 2024 T3 fuselage skin product. The data also show that, in order to achieve the optimum properties, it is important that both the composition and the process be in accordance with the invention.

Figure 8A:
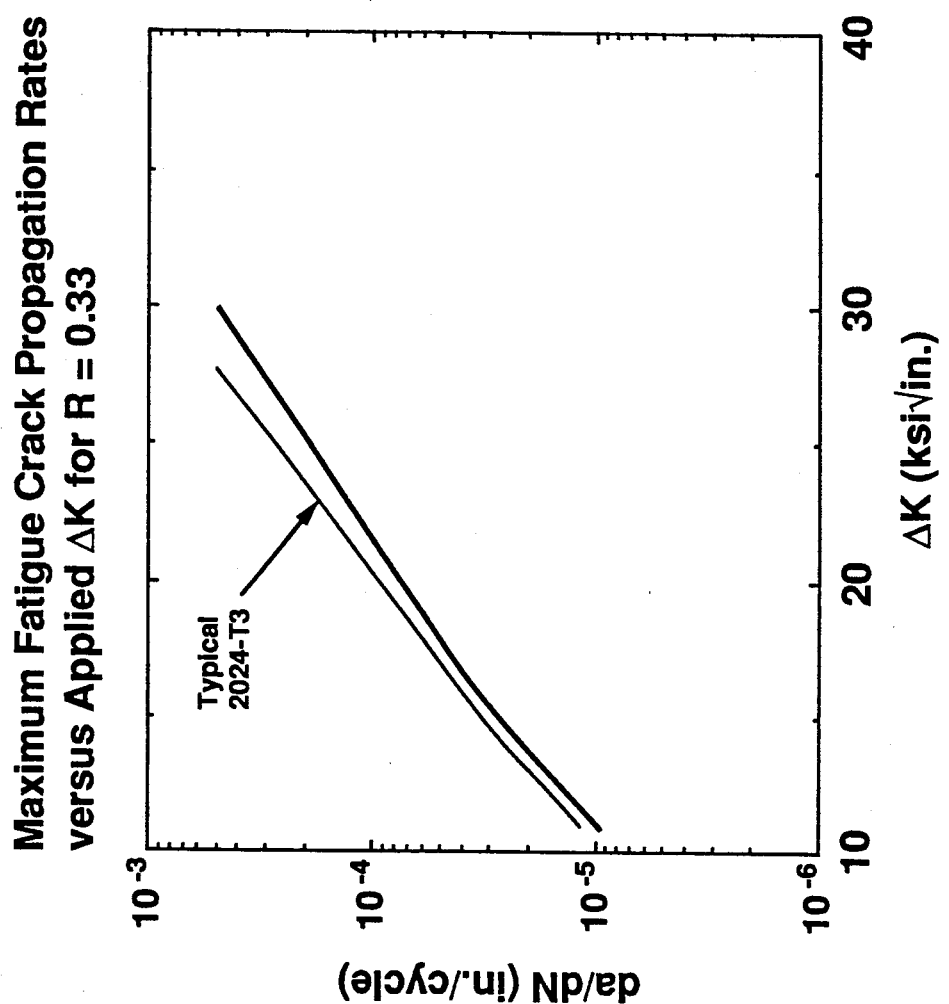
Figure 9:
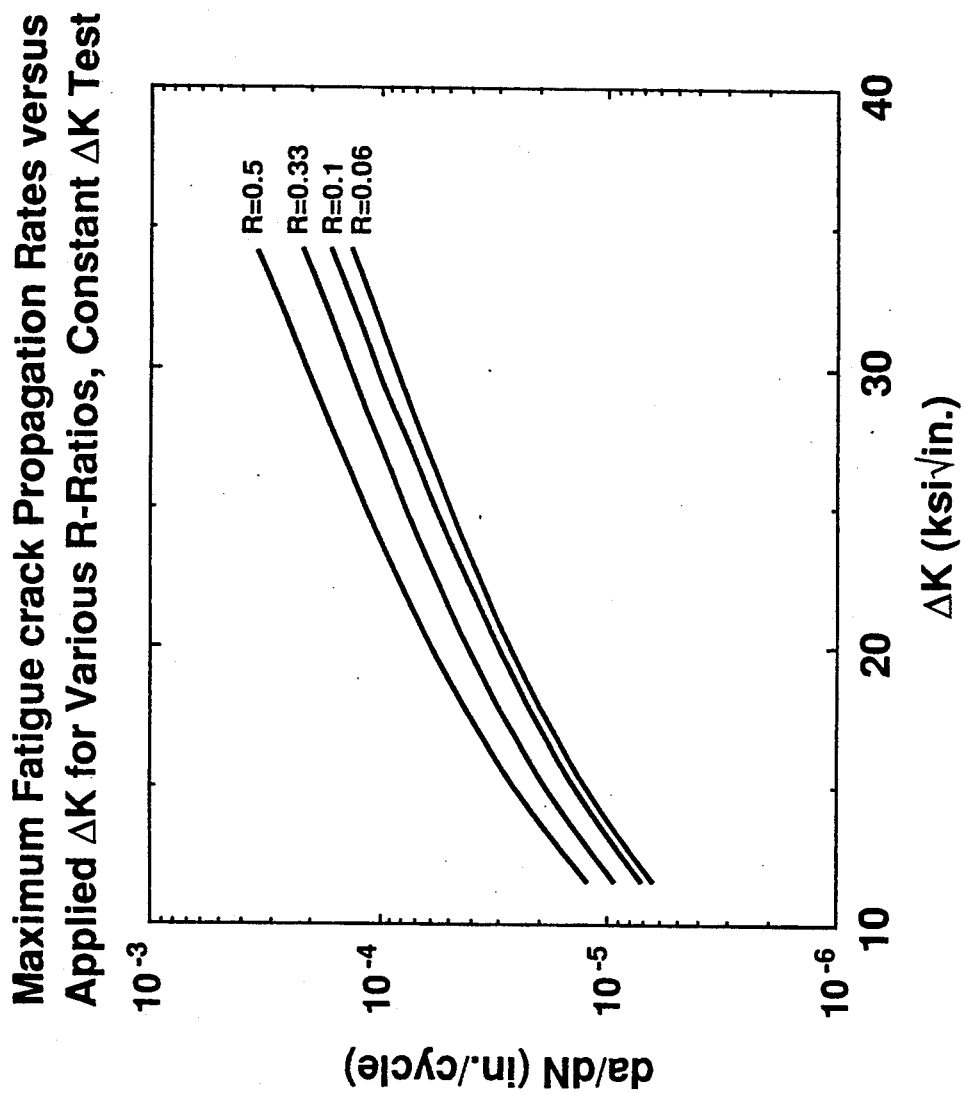
FIG. 9 plots maximum fatigue crack growth rate versus ΔK for the constant ΔK test.

The preferred maximum levels of fatigue crack growth rate for the invention product are shown in FIGS. 8 and 9 which delineate maximum crack growth rate levels for different $\Delta K$ and R values. Each figure includes a family of curves for different R values: R=0, 0.06, 0.1, 0.33 and 0.5 being shown. For R values between two of these values the maximum da/dN fatigue crack growth rate can be interpolated by estimation along a line between the closest R curves in accordance with known practices. For instance in FIG. 8, at $\Delta K = 25$ and R=0.2, the maximum da/dN in accordance with the invention is found by interpolation between the R=0.1 and R=0.33 curves to be about $1.5 \times 10^{-4}$.

For FIG. 8, the tests are the constant $\Delta K$ gradient test or the constant load test. For FIG. 9, the test is the constant $\Delta K$ test at steady state. FIGS. 8a and 8b use curves (for R=0.1 and R=0.33) from FIG. 8 as the heavy solid lines and add light line curves representing typical 2024 data. Again, the improvement of the invention is very noticeable in that the maximum fatigue crack growth rates shown for the invention are considerably below typical rates for 2024.

TABLE II

| Example 2 | Sample | EXAMPLE 2 Long Transverse Yield Strength | T-L Plane Stress Fracture Toughness $K_c$ | T-L da/dN* |
| --- | --- | --- | --- | --- |
| Part 1 | Invention Product | 46.6 | 156.5 | $5.62 \times 10^{-5}$ |
| Part 2 | Invention Composition/ Low Temperature Hold Before Hot Roll | 44.8 | 140.7 | $7.6 \times 10^{-5}$ |
| Part 3 | 2024 Composition/ Invention Processing | 46.4 | 134.7 | $9.08 \times 10^{-5}$ |
| Part 4 | 2024-T3 Composition/ Low Temperature Reheat | 43.8 | 117 | $11.6 \times 10^{-5}$ |

*Test performed with an R-ratio (minimum load/maximum load) equal to 0.1 and constant $\Delta K$ equal to 25 ksi$\sqrt{\text{in}}$; da/dN - Length of crack growth during one load/unload cycle. The test was a constant $\Delta K$ test, i.e., the loads (max and min) are reduced as the crack length grows.

Figure 6:
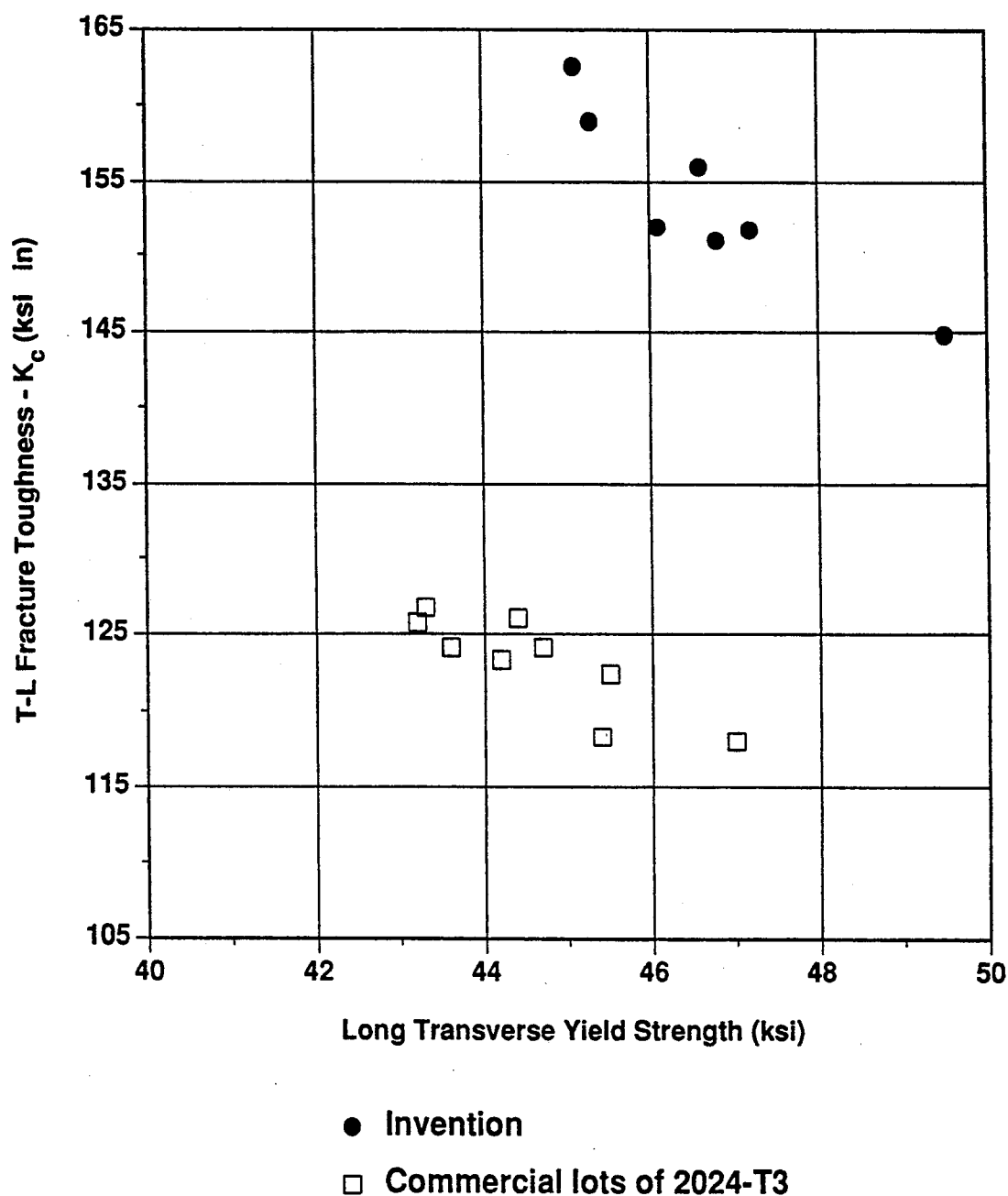
FIG. 6 shows fracture toughness and yield strength data for sheet products of the invention and for 2024-T3.

FIG. 6 shows typical strength versus toughness for the invention product in T3 temper and for commercial 2024-T3 for a number of commercial size lots for 0.1 inch thick sheet wherein it is clear that the invention product exhibits much better combinations of strength and T-L fracture toughness ($K_c$). In FIG. 6 all the 2024 exhibits $K_c$ toughness levels below 130 ksi$\sqrt{\text{in}}$ (and most below 125 ksi$\sqrt{\text{in}}$) whereas all the invention product exhibits $K_c$ above 130, above 135, above 140 and all equal to or exceed around 145 ksi$\sqrt{\text{in}}$. All but one of the invention products had a $K_c$ level above 150 ksi$\sqrt{\text{in}}$ and all had yield strength equal to or above 45 ksi, whereas a substantial amount of the 2024 T3 had yield strength below 45 ksi.

Figure 7:
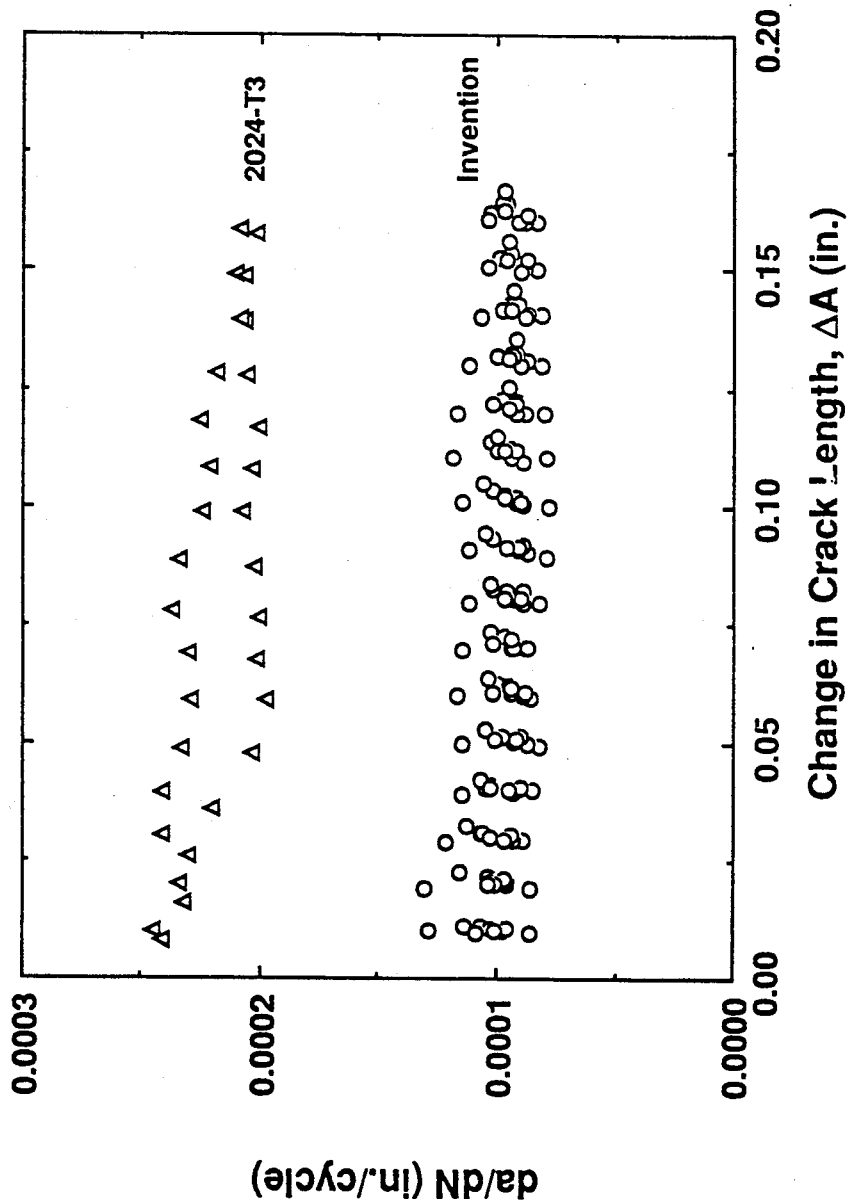
FIG. 7 shows fatigue crack propagation rate versus change in crack length for the invention product and for 2024-T3.

FIG. 7 shows fatigue crack growth rate versus change in crack length for commercial size lots of the invention product in T3 temper versus commercial 2024-T3 for 0.1 inch thick sheet wherein it is clear that the fatigue crack growth rate for 2024 is much faster than (practically twice) the rate for the invention product.

FIGS. 8 and 9 are intended to broadly encompass performance for preferred products in the respective tests for FIG. 8 (constant $\Delta K$ gradient/constant load) and FIG. 9 (constant $\Delta K$ test). This is intended to encompass any one or more of various test conditions as to $\Delta K$ or R (or both), for instance a constant $\Delta K$ (FIG. 9) of 30 ksi and R=0.1. The invention product satisfies one or more of the test criteria shown in FIGS. 8 or 9 although in a broader sense than shown in FIGS. 8 and 9, the invention encompasses products having a maximum fatigue crack growth rate as shown in FIG. 8 or 9 plus 5 or 10% or even 15%, especially at $\Delta K$ levels of 15 or 20, or preferably above 20 ksi$\sqrt{\text{in}}$, for instance 22 or 25 or 30 ksi$\sqrt{\text{in}}$. $\Delta K$. Hence, reference to FIG. 8 or 9 in the appended claims refers to any one (or more) set of test conditions embraced in said figures to set the maximum fatigue crack growth rate for that set of conditions or specifications.

Tables III and IV are intended as a further aid in reading FIGS. 8 and 9.

TABLE III

| | Maximum Fatigue Crack Propagation Rates, da/dN (in/cycle), of Invention Product at Selected Values of $\Delta K$ for the Constant K Gradient Test at Various R Ratios (FIG. 8) | | | | |
| --- | --- | --- | --- | --- | --- |
| $\Delta K$ (ksi$\sqrt{\text{in}}$.) | da/dN at R = 0 | da/dN at R = 0.06 | da/dN at R = 0.1 | da/dN at R = 0.33 | da/dN at R = 0.5 |
| 15 | $1.36 \times 10^{-5}$ | $1.59 \times 10^{-5}$ | $2.10 \times 10^{-5}$ | $2.68 \times 10^{-5}$ | $3.43 \times 10^{-5}$ |
| 20 | $3.38 \times 10^{-5}$ | $3.79 \times 10^{-5}$ | $5.26 \times 10^{-5}$ | $7.44 \times 10^{-5}$ | $1.18 \times 10^{-4}$ |
| 25 | $6.52 \times 10^{-5}$ | $7.44 \times 10^{-5}$ | $1.28 \times 10^{-4}$ | $1.93 \times 10^{-4}$ | $3.73 \times 10^{-4}$ |

TABLE III-continued

Maximum Fatigue Crack Propagation Rates, da/dN (in/cycle), of Invention Product at Selected Values of $\Delta K$ for the Constant K Gradient Test at Various R Ratios (FIG. 8)

| $\Delta K$ (ksi$\sqrt{}$in.) | da/dN at R = 0 | da/dN at R = 0.06 | da/dN at R = 0.1 | da/dN at R = 0.33 | da/dN at R = 0.5 |
|---|---|---|---|---|---|
| 30 | $1.37 \times 10^{-4}$ | $1.58 \times 10^{-4}$ | $3.06 \times 10^{-4}$ | $5.10 \times 10^{-4}$ | $1.16 \times 10^{-3}$ |

TABLE IV

Maximum Fatigue Crack Propagation Rates, da/dN (in/cycle), of Invention Product at Selected Values of $\Delta K$ for the Constant $\Delta K$ Gradient Test at Various R Ratios (FIG. 9)

| $\Delta K$ | da/dN at R = 0.06 | da/dN at R = 0.1 | da/dN at R = 0.33 | da/dN at R = 0.5 |
|---|---|---|---|---|
| 15 | $1.26 \times 10^{-5}$ | $1.41 \times 10^{-5}$ | $1.93 \times 10^{-5}$ | $2.68 \times 10^{-5}$ |
| 20 | $2.68 \times 10^{-5}$ | $3.06 \times 10^{-5}$ | $4.18 \times 10^{-5}$ | $6.10 \times 10^{-5}$ |
| 25 | $5.00 \times 10^{-5}$ | $5.81 \times 10^{-5}$ | $7.81 \times 10^{-5}$ | $1.18 \times 10^{-4}$ |
| 30 | $8.48 \times 10^{-5}$ | $1.10 \times 10^{-4}$ | $1.37 \times 10^{-4}$ | $2.13 \times 10^{-4}$ |

One recent requirement for aircraft fuselage material is its fatigue crack growth rate (da/dN) in a constant $\Delta K$ test at a $\Delta K$ of 30 ksi$\sqrt{}$in and a stress ratio R of 0.1 wherein the crack growth rate after crack stabilization is measured. In one series of such tests, the invention product has exhibited a maximum crack growth rate of less than about $1.15 \times 10^{-4}$ inches per cycle at a test frequency of 2 Hz and a relative humidity exceeding 95%. In these tests, a standard center slot test specimen with a center slot 0.2 inch long is fatigue cycled at a low load to cause the crack to grow. When the crack grows to $\frac{1}{2}$ inch long, the load is increased so that $\Delta K = 30$ ksi$\sqrt{}$in. The test is continued at a constant $\Delta K$ of 30 ksi$\sqrt{}$in until the crack reaches a length of one inch. The steady state fatigue crack propagation (following an initial higher rate) was measured as the crack grew from about 0.6 or 0.7 inch to about one inch long. Accordingly, it will be appreciated that the invention product can satisfy a maximum of $1.8 \times 10^{-4}$, or $1.6 \times 10^{-4}$, or preferably $1.4 \times 10^{-4}$, or more preferably $1.2 \times 10^{-4}$ inches per cycle in this type test. That is, a specification maximum from about $1.8 \times 10^{-4}$ inch per cycle down to 1.2 or $1.15 \times 10^{-4}$ inch per cycle in this test is equaled or bettered by the invention product. Thus in a substantially constant $\Delta K$ test wherein $\Delta K$ is substantially about 30 ksi$\sqrt{}$in (for instance 27 or 28 to 32 ksi$\sqrt{}$in or 30 ksi$\sqrt{}$in±10 or 15%) and R is substantially about 0.1 (for instance 0.1±0.01 or 0.02) the maximum fatigue crack growth rate for invention sheet product includes the levels just described for the substantially steady state part of the test.

Figure 10:
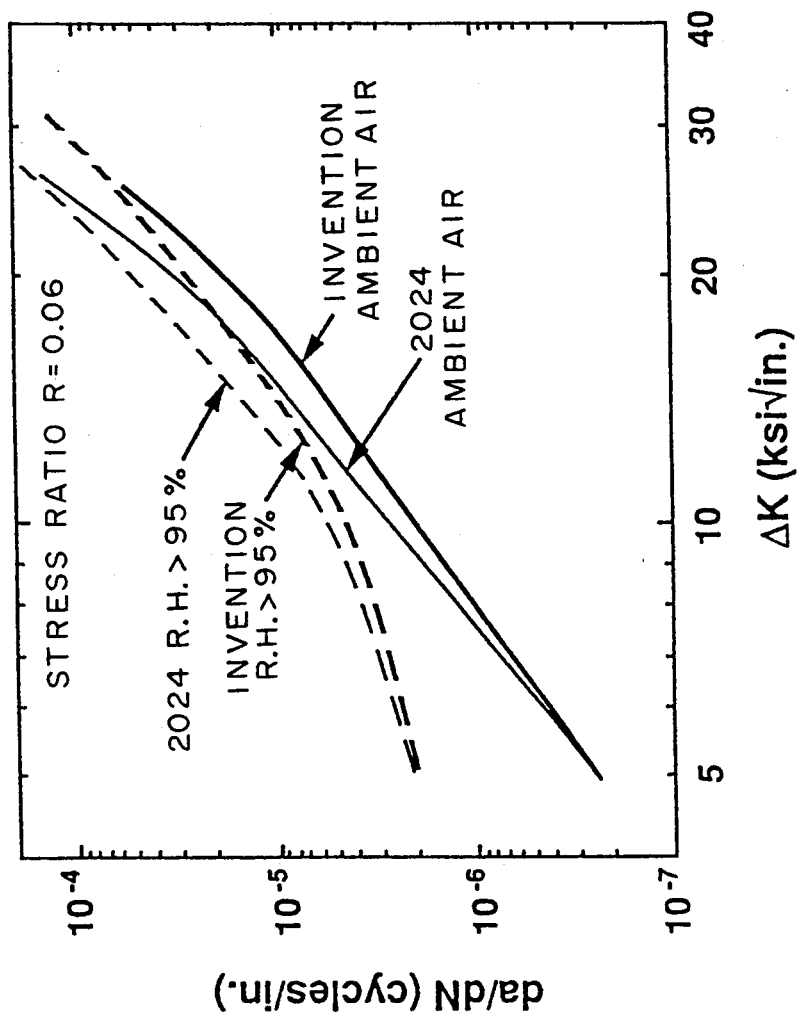
FIG. 10 plots fatigue crack growth rate versus ΔK for different relative humidity levels (95% humidity and ordinary ambient).

The fatigue crack growth rate testing herein described was performed in a relative humidity (R.H.) of 95%. This high R.H. makes the test more severe and more precise over tests run in uncontrolled ambient conditions. FIG. 10 compares fatigue crack growth rate tests in 95% relative humidity versus ambient air for both the invention product and for 2024-T3 sheet. The difference attributed to ambient versus high R.H. test conditions becomes significant at $\Delta K$'s below about 25 ksi$\sqrt{}$in with the difference increasing as $\Delta K$ decreases. For instance, at a $\Delta K$ of 20 ksi$\sqrt{}$in 2024-T3 da/dN is a little above $3 \times 10^{-5}$ inch/cycle for an ambient air test, whereas it increases to about $5 \times 10^{-5}$ for a 95% R.H. test. At a $\Delta K$ of 10 ksi$\sqrt{}$in, the da/dN figures for 2024-T3 are about $3 \times 10^{-6}$ for ambient air and $6 \times 10^{-6}$ for 95% R.H. test. At a $\Delta K$ of 7, the difference is even greater; about $8 \times 10^{-7}$ in air versus $3.1 \times 10^{-6}$ in 95% R.H. The table below further illustrates this difference.

TABLE V

| Alloy | Test Condition | da/dN $\Delta K = 7$ | da/dN $\Delta K = 10$ | da/dN $\Delta K = 20$ |
|---|---|---|---|---|
| 2024-T3 | Ambient | $8 \times 10^{-7}$ | $3 \times 10^{-6}$ | $3 \times 10^{-5}$ |
|  | 95% R.H. | $3.1 \times 10^{-6}$ | $6 \times 10^{-6}$ | $5 \times 10^{-5}$ |
| Improved Product | Ambient | $6.5 \times 10^{-7}$ | $2 \times 10^{-6}$ | $1.8 \times 10^{-5}$ |
|  | 95% R.H. | $2.6 \times 10^{-6}$ | $4.5 \times 10^{-6}$ | $2.9 \times 10^{-5}$ |

Accordingly it can be preferable to conduct fatigue crack growth rate tests in an atmosphere having a relative humidity above 75 or 80%, preferably 85% or 90% minimum, more preferably around 95%, for instance 95%±5%.

Another factor that can influence fatigue crack growth rate test results is the frequency at which the loads are applied to the specimen in the test. This effect can be more pronounced at higher relative humidity levels in the test environment. For instance, a difference in test frequency may be minimal or virtually non-existent if the test is carried out in dry argon. However, where the test is carried out in 95% relative humidity air, a lower test frequency generally produces higher fatigue crack growth rates. Unless indicated otherwise, for the tests conducted herein, the following frequencies were employed in the fatigue crack growth rate tests, the frequency referring to the number of times per second the test specimen was cycled from low to high load level and back. For constant $\Delta K$ tests, the frequency typically was approximately 5 Hz (5 cycles per second) for $\Delta K$'s other than 30 (about 2 Hz for $\Delta K = 30$ ksi$\sqrt{}$in), and for the constant $\Delta K$ gradient tests, the frequency started at approximately 25 cycles per second, but as the crack grew to a substantial length, the number of cycles per second decreased to frequencies of as low as 5 cycles per second because of equipment limitations. As is readily apparent, it can be useful to account for differences in test conditions in comparing one test to another, and it will be appreciated that in construing the extent of the present invention and the claims appended hereto, adjustments for different test conditions may be needed to appreciate the broad scope of the invention. Accordingly, in referring to FIGS. 8 and 9 in the claims as setting maximum da/dN levels, it is intended to adjust such for differences in test conditions such as humidity, cycles per unit time, or any other influence, as well as interpreting for R values different than those shown.

The extent of the invention's improvement over conventionally produced 2024-T3 commercial products in toughness (measured as $K_c$ or as $K_{app}$) is at least 5 to 10%, ranging up to 20% or 30% or more. This enables guaranteeing a minimum level of toughness performance much higher than possible with conventional 2024, which normally was not specified to a minimum level of toughness, that is, toughness was not normally guaranteed for 2024.

The extent of the invention's improvement over conventionally produced 2024-T3 commercial products in reduced (lower) fatigue crack growth rate (a toughness related property) is pronounced, especially at medium to higher levels of $\Delta K$ such as 7 ksi$\sqrt{}$in to 15 ksi$\sqrt{}$in or, even more importantly, at $\Delta K$ levels above 15 ksi$\sqrt{}$in such as $\Delta K$ of 20 ksi$\sqrt{}$in to 25 ksi$\sqrt{}$in or 30 or more ksi$\sqrt{}$in $\Delta K$ where the extent of the improvement grows with increasing $\Delta K$. The fatigue crack growth rate of the invention represents an improvement of at least 5 to 10 or 20% over 2024-T3 (crack grows at least 10 to 20% slower than for 2024-T3) and, especially at $\Delta K$ levels above 20, the invention represents an improvement of at least 10% and up to 50% or even more (at 50% improvement a crack grows half as fast as for 2024-T3).

In referring to improvements over 2024 or over 2024-T3, such generally and preferably refers to similar product form, for instance plate versus plate, clad sheet versus clad sheet, or at least to 2024 product forms expected to have similar property levels to the product form being compared.

The significance of the higher toughness and better (lower) fatigue crack growth rate achieved with the invention is that the aircraft fuselage designer can save significant weight by reducing the thickness of fuselage sheet or even by redesigning the structure to eliminate or reduce straps or other auxiliary, or secondary, components which are sometimes attached to fuselage skin to reinforce against tearing. Such auxiliary components, which can be generically referred to as "crack stoppers", decrease the stress in a cracked portion of the fuselage so that the crack shouldn't propagate beyond a certain point. The product of the invention has a fracture toughness so high, and fatigue crack growth rate so low, that it can facilitate designs without such components, or at least reduced components, for example, a reduced number of, or lighter weight, "tear crack stopper" components, or both, or even elimination of such components, without having to add excessive thickness to the fuselage skin itself to compensate for the reduced reinforcement. Another advantage of the lower rate of growth of cracks by fatigue achieved by the invention is that it allows the aircraft users to increase the intervals between inspection for cracks and defects, thereby reducing the costs of the inspections and reducing costs of operation and increasing the value of the aircraft to the user. The invention product also provides for increasing the number of pressurization/depressurizing or other stressful cycles further reducing operation costs and enhancing the value of an aircraft. In addition, the toughness of the improved products is so high that the aircraft designer's focus for a material's robustness or damage tolerance can change from toughness measurements to fatigue crack growth rate.

Toughness and fatigue measuring and testing has been described in some particularity, it being understood that the aforesaid testing is intended to illustrate the good property levels of the invention but not necessarily in limitation thereof. For instance, other methods of testing may be developed over time and the good performance of the invention can be measured by those methods as well. It is to be understood that the invention product properties are generally or substantially equivalent to the described test results regardless of the particular test method used. It is to be understood that the herein described practices, especially preferred practices, impart to the invention alloy a condition where it exhibits good property combinations useful in aerospace and other uses.

The invention provides products suitable for use in large airplanes, such as large commercial passenger and freight airplanes, or other aircraft or aerospace vehicles. Such products, themselves, are typically large, typically several feet in length, for instance 5 or 10 feet up to 25 or 30 feet or even 50 feet or more, and 2 to 6 or 7 feet or more wide. Yet even in these large sizes, the invention products achieve good property combinations. Hence, a particular advantage of the invention is sufficiently large size products to be suited to major structure components in aircraft, such as major aircraft fuselage components and possibly other components such as wing section, fuselage section, tail section (empennage). The invention sheet and plate product (generically referred to as rolled stock) can be shaped into a member for an airplane, such as a fuselage component or panel, or such as a wing component or panel, and the airplane can utilize the advantage of the invention as described. The shaping referred to can include bending, stretch forming, machining and other shaping operations known in the art for shaping panels or other members for aircraft, aerospace or other vehicles. Forming involving bending or other plastic deformation can be performed at room temperature or at elevated temperatures such as around 200° to 400° or so. If elevated temperatures are used in forming, such can be used in an artificial aging treatment as earlier described. The member can also include attached stiffeners or strengtheners such as structural beams attached by riveting or other means.

Unless indicated otherwise, the following definitions apply herein:

a. The term "ksi" is equivalent to kilopounds per square inch.
b. Percentages for a composition refer to % by weight.
c. The term "ingot-derived" means solidified from liquid metal by a known or subsequently developed casting process rather than through powder metallurgy techniques. This term shall include, but not be limited to, direct chill casting, electromagnetic continuous casting, spray casting and any variations thereof.
d. In stating a numerical range for an element of a composition or a temperature or other process matter or a property or an extent of improvement or any other matter herein, and apart from and in addition to the customary rules for rounding off numbers, such is intended to specifically designate and disclose each number, including each fraction and/or decimal, between the stated minimum and maximum for said range. (For example, a range of 1 to 10 discloses 1.1, 1.2 ... 1.9, 2, 2.1, 2.2 ... and so on, up to 10. Similarly, a range of 500 to 1000 discloses 501, 502 ... and so on, up to 1000, including every number and fraction or decimal therewithin.) "Up to x" means "x" and every number less than "x", for instance up to 5 discloses 0.01 ... 0.1 ... 1 and so on up to 5.

While the invention is described in terms of certain specifics and embodiments, the claims herein are intended to encompass all equivalents and everything encompassed within the spirit of the invention.

Having thus described the invention, what is claimed is:

1. A method of producing an aluminum product comprising:

(a) providing stock comprising an aluminum alloy consisting essentially of, by weight, about 3.8 to 4.5% copper, about 1.2 to 1.8% magnesium, about 0.3 to 0.9% manganese, the remainder substantially aluminum, incidental elements and impurities;
(b) hot working said stock;
(c) heating said stock above about 895° F. to less than 975° F.;
(d) hot rolling said stock;
(e) solution heat treating;
(f) cooling.

2. The method according to claim 1 wherein said alloy contains one or more elements from the group consisting of 0.02 to 0.4 % Zr, 0.01 to 0.5% V, 0.01 to 0.4% Hf, 0.01 to 0.2% Cr, 0.01 to 1% Ag and 0.01 to 0.5% Sc, percentages being by weight.

3. The method according to claim 1 wherein said alloy contains less than 0.25% Fe and less than 0.25% Si, percentages being by weight.

4. The method according to claim 1 wherein said alloy contains not more than about 0.15% Fe and not more than about 0.15% Si, percentages being by weight.

5. The method according to claim 1 wherein said heating in recitation (c) is within about 900° to less than 975° F.

6. The method according to claim 1 wherein said heating in recitation (c) is within about 900° to 960° F.

7. The method according to claim 1 wherein said heating in recitation (c) is within about 905° to 950° F.

8. The method according to claim 1 wherein said heating in recitation (c) is within about 910° to 945° F.

9. The method according to claim 1 wherein said heating and solution heat treating are within about 910° to 935° F.

10. The method according to claim 1 wherein said heating above about 895° F. is longer than 2 hours.

11. The method according to claim 1 wherein said heating above about 895° F. is 3 or more hours.

12. The method according to claim 7 wherein said heating within about 910° to 945° F. is 4 to 24 hours.

13. The method according to claim 1 wherein, after said cooling, a working effect is imparted substantially equivalent to stretching at least 1% at room temperature.

14. The method according to claim 1 wherein, after said cooling, a working effect is imparted substantially equivalent to stretching at least 3% at room temperature.

15. The method according to claim 1 wherein, after said cooling, a working effect is imparted substantially equivalent to stretching at least 4% at room temperature.

16. The method according to claim 1 wherein, after said cooling and at least some significant aging effect, a working effect is imparted substantially equivalent to stretching at least 1% at room temperature.

17. The method according to claim 13 wherein said working effect includes stretching.

18. The method according to claim 13 wherein said working effect includes cold rolling.

19. The method according to claim 1 wherein said method includes, after said cooling, artificially aging above room temperature.

20. The method according to claim 1 wherein said method includes, after said cooling, artificially aging above room temperature, and during said artificial aging, forming or deforming the metal.

21. The method according to claim 1 wherein, subsequent to said cooling, a forming or shaping operation is performed above room temperature.

22. A method of producing an aluminum sheet or plate product comprising:
(a) providing stock comprising an aluminum alloy consisting essentially of, by weight, about 3.8 to 4.5% copper, about 1.2 to 1.8% magnesium, about 0.3 to 0.9% manganese, and containing about 0.01 to less than 0.2% iron, about 0.01 to less than 0.2% silicon, the remainder substantially aluminum, incidental elements and impurities;
(b) hot rolling said stock;
(c) heating the hot rolled stock within about 900° to 965° F.;
(d) further hot rolling said stock;
(e) cold rolling said stock;
(f) solution heat treating.

23. The method according to claim 22 wherein said heating in recitation (c) and said solution heat treating are within about 905° to 950° F.

24. The method according to claim 22 wherein said alloy contains not more than about 0.15% Fe and not more than about 0.15% Si, percentages being by weight.

25. The method according to claim 22 wherein said alloy contains, by weight, not more than about 0.15% Fe and not more than about 0.15% Si and said heating in recitation (c) and said solution heat treating are within about 905° to 945° F. and said sheet or plate is naturally aged.

26. The method according to claim 22 wherein said heating in recitation (c) is for at least 3 hours.

27. The method according to claim 22 wherein said heating in recitation (c) is for at least 4 hours.

28. A method of producing an aluminum sheet or plate product comprising:
(a) providing stock comprising an aluminum alloy consisting essentially of, by weight, about 3.8 to 4.5% copper, about 1.2 to 1.8% magnesium, about 0.3 to 0.9% manganese, and containing about 0.01 to less than 0.2% iron, about 0.01 to less than 0.2% silicon, the remainder substantially aluminum, incidental elements and impurities;
(b) hot rolling said stock;
(c) heating said hot rolled stock within about 900° to 965° F.;
(d) further hot rolling said stock;
(e) solution heat treating.

29. The method according to claim 28 wherein said heating and solution heat treating are within about 905° to 950° F.

30. The method according to claim 28 wherein said alloy contains, by weight, not more than about 0.15% Fe and not more than about 0.15% Si.

31. The method according to claim 28 wherein said alloy contains, by weight, not more than about 0.15% Fe and not more than about 0.15% Si and said heating and solution heat treating are within about 905° to 950° F. and said sheet or plate is naturally aged.

32. The method according to claim 28 wherein said heating is for at least 3 hours.

33. The method according to claim 28 wherein said heating is for more than 2 hours.

34. A method of producing a clad aluminum product comprising:
(a) providing stock comprising:

(i) an aluminum alloy consisting essentially of, by weight, about 3.8 to 4.5% copper, about 1.2 to 1.8% magnesium, about 0.3 to 0.9% manganese, the remainder substantially aluminum, incidental elements and impurities;
(ii) a cladding thereon of a different aluminum alloy or aluminum;
(b) hot working said stock;
(c) heating said stock within about 900° to less than 975° F.;
(d) further hot rolling said stock;
(e) solution heat treating.

35. The method according to claim 34 wherein said alloy contains, by weight, not more than about 0.15% for Fe and not more than about 0.15% for Si.

36. The method according to claim 34 wherein said heating is within about 900° to 950° F.

37. The method according to claim 34 wherein both said heating and said solution heat treating are within about 905° to 950° F.

38. A method of producing a clad aluminum sheet or plate product comprising:
(a) providing stock comprising:
(i) an aluminum alloy consisting essentially of, by weight, about 3.8 to 4.5% copper, about 1.2 to 1.8% magnesium, about 0.3 to 0.9% manganese, and containing less than about 0.2% iron and less than about 0.2% silicon, the remainder substantially aluminum, incidental elements and impurities;
(ii) a cladding thereon of a different aluminum alloy or aluminum;
(b) hot rolling said stock;
(c) heating said stock within about 900° to 960° F.;
(d) hot rolling said stock;
(e) cold rolling said stock;
(f) solution heat treating within about 900° to 950° F.

39. The method according to claim 38 wherein said hot rolling in recitation (b) reduces the thickness of the stock by at least 40%.

40. The method according to claim 38 wherein said alloy contains, by weight, 0.15% max. Fe and 0.15% max. Si.

41. The method according to claim 38 wherein said alloy contains, by weight, 0.15% max. Fe and 0.15% max. Si and said heating and solution heat treating are within about 905° to 950° F.

42. The method according to claim 38 wherein said heating is for at least 3 hours.

43. The method according to claim 38 wherein said heating is for at least 4 hours.

44. A method of producing a clad aluminum sheet or plate product comprising:
(a) providing stock comprising:
(i) an aluminum alloy consisting essentially of, by weight, about 3.8 to 4.5% copper, about 1.2 to 1.8% magnesium, about 0.3 to 0.9% manganese, and containing about 0.01 to 0.15% iron, about 0.01 to 0.15% silicon, the remainder substantially aluminum, incidental elements and impurities;
(ii) a cladding thereon of a different aluminum alloy or aluminum;
(b) hot rolling said stock to a reduction in thickness of at least 40%;
(c) heating said stock within about 900° to 965° F.;
(d) hot rolling said stock;
(e) solution heat treating at at least 900° F.

45. The method according to claim 44 wherein said heating and solution heat treating are within 905° to 950° F.

46. The method according to claim 44 wherein said alloy contains, by weight, 1.2 to 1.6% Mg.

47. The method according to claim 44 wherein said alloy contains, by weight, 1.2 to 1.6% Mg and 4 to 4.5% Cu.

48. The method according to claim 44 wherein said heating is for at least 3 hours.

49. The method according to claim 44 wherein said heating is for at least 4 hours.

50. A method of producing a clad aluminum product having good strength along with good fracture toughness or good resistance to fatigue crack growth, or both, said method comprising:
(a) providing stock comprising:
(i) an aluminum alloy consisting essentially of, by weight, about 4 to 4.5% copper, about 1.2 to 1.5% magnesium, about 0.4 to 0.8% manganese, and containing about 0.01 to less than 0.2% iron, about 0.01 to less than 0.2% silicon, the remainder substantially aluminum, incidental elements and impurities;
(ii) a cladding thereon of a different aluminum alloy or aluminum;
(b) hot rolling said stock;
(c) heating said stock to at least 900° F. but not so high a temperature as to prevent achieving the aforesaid properties;
(d) further hot rolling said stock;
(e) solution heat treating;
(f) cooling.

51. A method of producing a clad aluminum sheet or plate product comprising:
(a) providing stock comprising:
(i) an aluminum alloy consisting essentially of, by weight, about 4 to 4.5% copper, about 1.2 to 1.5% magnesium, about 0.3 to 0.8% manganese, and containing not more than about 0.15% max. iron and not more than about 0.15% max. silicon, the remainder substantially aluminum, incidental elements and impurities;
(ii) a cladding thereon of a different aluminum alloy or aluminum;
(b) hot rolling said stock;
(c) heating the hot rolled stock within about 900° to 960° F.;
(d) further hot rolling said stock;
(e) cold rolling said stock;
(f) solution heat treating;
(g) cooling;
(h) natural aging.

52. The method according to claim 51 wherein said alloy contains, by weight, not more than about 0.12% Fe and not more than about 0.1% Si.

53. The method according to claim 51 wherein said heating is for more than 2 hours.

54. The method according to claim 51 wherein said heating and said solution heat treating is within about 905° to 950° F.

55. The method according to claim 51 wherein said hot rolling in recitation (b) reduces the thickness of said stock by at least 40%.

56. A method of producing an aluminum sheet or plate product comprising:
(a) providing stock comprising an aluminum alloy consisting essentially of, by weight, about 4 to 4.5% copper, about 1.2 to 1.5% magnesium, about 0.3 to 0.78% manganese, and containing not more than about 0.15% iron and not more than about 0.15% silicon, the remainder substantially aluminum, incidental elements and impurities;
(b) hot rolling said stock;
(c) heating said hot rolled stock within about 900° to less than 975° F.;
(d) further hot rolling said stock;
(e) solution heat treating;
(f) stretching;
(g) natural aging.

57. The method according to claim 56 wherein said alloy contains, by weight, not more than about 0.12% Fe and not more than about 0.1% Si.

58. The method according to claim 56 wherein said heating is for more than 2 hours.

59. The method according to claim 56 wherein said heating and said solution heat treating are within about 905° to 950° F.

60. The method according to claim 56 wherein said hot rolling in recitation (b) reduces the thickness by at least 40%.

61. A method of producing a clad aluminum product comprising:
(a) providing stock comprising:
    (i) an aluminum alloy consisting essentially of, by weight, about 4 to 4.5% copper, about 1.2 to 1.5% magnesium, about 0.3 to 0.8% manganese, and containing about 0.01 to 0.15% iron, about 0.01 to 0.15% silicon, the remainder substantially aluminum, incidental elements and impurities;
    (ii) a cladding thereon of a different aluminum alloy or aluminum;
(b) hot rolling said stock, comprising rolling within 600° to 900° F., to a reduction in thickness of at least 40%;
(c) heating said stock within about 905° to 950° F. for about 3 to 24 hours;
(d) further hot rolling said stock comprising rolling within 550° to 900° F.;
(e) solution heat treating at at least 900° F.

62. A method of producing a clad aluminum sheet product comprising:
(a) providing stock comprising:
    (i) an aluminum alloy consisting essentially of, by weight, about 4 to 4.5% copper, about 1.2 to 1.5% magnesium, about 0.3 to 0.8% manganese, and containing about 0.01 to 0.15% iron, about 0.01 to 0.15% silicon, the remainder substantially aluminum, incidental elements and impurities;
    (ii) a cladding thereon of a different aluminum alloy or aluminum;
(b) hot rolling said stock, comprising rolling within 600° to 900° F., to a reduction in thickness of at least 40%;
(c) heating said stock within about 905° to 950° F. for more than 2 hours;
(d) further hot rolling said stock comprising rolling within 550° to 900° F.;
(e) cold rolling said stock to a thickness within 0.03 to about 0.3 inch sheet;
(f) solution heat treating at a temperature of at least 900° F.
(g) stretching;
(h) natural aging.

63. A method of producing a clad aluminum product having good strength along with good fracture toughness or good resistance to fatigue crack growth, or both, said method comprising:
(a) providing aluminous stock comprising:
    (i) an aluminum alloy consisting essentially of, by weight, about 3.9 to 4.5% copper, about 1.2 to 1.8% magnesium, about 0.3 to 0.9% manganese, and containing about 0.01 to 0.15% iron, about 0.01 to 0.15% silicon, the remainder substantially aluminum, incidental elements and impurities;
    (ii) a cladding thereon of a different aluminum alloy or aluminum;
(b) hot rolling said stock;
(c) heating said hot rolled stock within about 900° to 960° F.;
(d) further hot rolling said stock;
(e) solution heat treating temperature at at least 900° F.;
(f) cooling;
(g) imparting a cold work effect;
(h) natural aging.

64. A method of producing a clad aluminum product having good strength along with good fracture toughness or good resistance to fatigue crack growth, or both, said method comprising:
(a) providing aluminous stock comprising:
    (i) an aluminum alloy consisting essentially of, by weight, about 3.9 to 4.5% copper, about 1.2 to 1.8% magnesium, about 0.3 to 0.9% manganese, and containing about 0.01 to 0.15% iron, about 0.01 to 0.15% silicon, the remainder substantially aluminum, incidental elements and impurities;
    (ii) a cladding thereon of a different aluminum alloy or aluminum;
(b) hot rolling said stock;
(c) heating said hot rolled stock within about 900° to 960° F. for more than 2 hours;
(d) further hot rolling said stock;
(e) solution heat treating at at least 900° F.;
(f) cooling;
(g) natural aging;
(h) imparting a cold work effect.

65. In a method wherein an aluminum alloy stock is shaped into an airplane member, the improvement wherein said stock is provided by a method comprising:
(a) providing aluminous stock comprising an aluminum alloy consisting essentially of, by weight, about 3.8 to 4.5% copper, about 1.2 to 1.8% magnesium, about 0.3 to 0.9% manganese, the remainder substantially aluminum, incidental elements and impurities;
(b) hot rolling said stock;
(c) heating said stock within about 900° to less than 975° F.;
(d) further hot rolling said stock;
(e) solution heat treating.

66. In a method wherein an aluminum alloy stock is shaped into an airplane member, the improvement wherein said stock is provided by a method comprising:
(a) providing aluminous stock comprising:
    (i) an aluminum alloy consisting essentially of, by weight, about 3.8 to 4.5% copper, about 1.2 to 1.8% magnesium, about 0.3 to 0.9% manganese, and containing not more than about 0.15% iron and not more than about 0.15% silicon, the remainder substantially aluminum, incidental elements and impurities;

(ii) a cladding thereon of a different aluminum alloy or aluminum;
(b) hot rolling said stock;
(c) heating said stock within about 900° to 960° F.;
(d) further hot rolling said stock;
(e) solution heat treating.

67. In a method wherein an aluminum alloy sheet is shaped into an airplane member, the improvement wherein said sheet is provided by a method comprising:
(a) providing aluminous stock comprising:
(i) an aluminum alloy consisting essentially of, by weight, about 4 to 4.5% copper, about 1.2 to 1.5% magnesium, about 0.4 to 0.8% manganese, and containing about 0.01 to 0.15% iron, about 0.01 to 0.15% silicon, the remainder substantially aluminum, incidental elements and impurities;
(ii) a cladding thereon of a different aluminum alloy or aluminum;
(b) hot rolling said stock, comprising rolling within 600° to 900° F., to a reduction in thickness of at least 40%;
(c) heating said hot rolled stock within about 900° to 950° F. for more than 2 hours;
(d) further hot rolling said stock comprising rolling within 550° to 900° F.;
(e) solution heat treating at at least 900° F.;
(f) natural aging.

68. In a method wherein an aluminum alloy material is shaped into a vehicular panel, the improvement wherein said material is provided by a method comprising:
(a) providing aluminous stock comprising an aluminum alloy consisting essentially of, by weight, about 3.8 to 4.5% copper, about 1.2 to 1.8% magnesium, about 0.3 to 0.9% manganese, the remainder substantially aluminum, incidental elements and impurities;
(b) hot rolling said stock;
(c) heating said stock within about 900° to less than 970° F.;
(d) further hot rolling said stock;
(e) solution heat treating.

69. In a method wherein an aluminum alloy material is shaped into a vehicular panel, the improvement wherein said material is provided by a method comprising:
(a) providing aluminous stock comprising:
(i) an aluminum alloy consisting essentially of, by weight, about 3.8 to 4.5% copper, about 1.2 to 1.8% magnesium, about 0.3 to 0.9% manganese, the remainder substantially aluminum, incidental elements and impurities;
(ii) a cladding thereon of a different aluminum alloy or aluminum;
(b) hot rolling said stock;
(c) heating said stock within 900° to 960° F.;
(d) further hot rolling said stock;
(e) solution heat treating;
(f) cooling.

70. A product comprising an aluminum base alloy consisting essentially of, by weight, about 3.8 to 4.5% copper, about 1.2 to 1.8% magnesium, about 0.3 to 0.9% manganese, the balance essentially aluminum and incidental elements and impurities, said product having at least 5% improvement over 2024 alloy in (a) T-L fracture toughness property, or (b) fatigue crack growth rate property at a $\Delta K$ level of 15ksi$\sqrt{}$in or more, or in both said (a) and (b) properties.

71. An aluminum alloy sheet or plate product comprising an aluminum base alloy consisting essentially of, by weight, about 3.9 to 4.5% copper, about 1.2 to 1.5% magnesium, about 0.3 to 0.8% manganese, and containing not more than about 0.15% iron, not more than about 0.15% silicon, the balance essentially aluminum and incidental elements and impurities, said product having a long transverse yield strength of 38 ksi or more and at least 5% improvement over 2024 in (a) T-L fracture toughness property, or (b) fatigue crack growth rate property at a $\Delta K$ level of 15 ksi$\sqrt{}$in or more, or in both said (a) and (b) properties.

72. An aluminum alloy product comprising an aluminum base alloy consisting essentially of, by weight, about 3.9 to 4.5% copper, about 1.2 to 1.8% magnesium, about 0.3 to 0.9% manganese, the balance essentially aluminum and incidental elements and impurities, said aluminum alloy product having one or more of the following properties: (a) a maximum fatigue crack growth rate not greater than 10% above one or more of the levels shown in FIG. 8 or 9; (b) a minimum T-L fracture toughness $K_c$ of at least 140 ksi$\sqrt{}$in; (c) a minimum T-L fracture toughness $K_{app}$ of at least 8 ksi$\sqrt{}$in.

73. An aluminum alloy sheet or plate product comprising an aluminum base alloy consisting essentially of, by weight, about 3.9 to 4.5% copper, about 1.2 to 1.8% magnesium, about 0.3 to 0.9% manganese, and containing not more than 0.15% iron and not more than about 0.15% silicon, the balance essentially aluminum and incidental elements and impurities, said aluminum alloy product having a long transverse yield strength of 38 ksi or more together with one or more of the following properties: (a) a maximum fatigue crack growth rate not greater than 5% above one or more of the levels shown in FIG. 8 or 9; (b) a minimum T-L fracture toughness at least equivalent to a $K_c$ of 140 ksi$\sqrt{}$in in a test panel around 16 inches wide; (c) a minimum T-L fracture toughness at least equivalent to a $K_{app}$ of 80 ksi$\sqrt{}$in in a test panel around 16 inches wide.

74. An aluminum alloy sheet product comprising an aluminum base alloy consisting essentially of, by weight, about 3.9 to 4.5% copper, about 1.2 to 1.5% magnesium, about 0.3 to 0.9 manganese, and containing not more than about 0.15% iron and not more than about 0.15% silicon, the balance essentially aluminum and incidental elements and impurities, said sheet having a long transverse yield strength of 39 ksi or more and a minimum T-L fracture toughness $K_c$ of at least 140 ksi$\sqrt{}$in or more and a fatigue crack growth rate not greater than 5% above one or more of the levels shown in FIG. 8 or 9.

75. An aluminum alloy sheet product comprising an aluminum base alloy consisting essentially of, by weight, about 3.9 to 4.5% copper, about 1.2 to 1.5% magnesium, about 0.4 to 0.78% manganese, and containing not more than about 0.15% iron and not more than about 0.15% silicon, the balance essentially aluminum and incidental elements and impurities, said sheet having a long transverse yield strength of 38 ksi or more and a minimum T-L fracture toughness $K_{app}$ of 80 ksi$\sqrt{}$in. or more and a fatigue crack growth rate not greater than 5% above one or more of the levels shown in FIG. 8 or 9.

76. An aluminum alloy sheet or plate product comprising a first aluminum base alloy consisting essentially of, by weight, about 3.9 to 4.5% copper, about 1.2 to 1.8% magnesium, about 0.3 to 0.9% manganese, the balance essentially aluminum and incidental elements and impurities, and a cladding layer comprising aluminum or an aluminum alloy different from said first alloy on one or more faces thereof, said sheet having a minimum long transverse yield strength of 38 ksi or more and at least 5% improvement over 2024 in (a) T-L fracture toughness property, or (b) fatigue crack growth rate property at a $\Delta K$ level of 15 ksi$\sqrt{}$in or more, or in both said properties.

77. An aluminum alloy sheet or plate product comprising a first aluminum base alloy consisting essentially of, by weight, about 4 to 4.5% copper, about 1.2 to 1.5% magnesium, about 0.3 to 0.8% manganese, and containing not more than about 0.15% iron and not more than about 0.15% silicon, the balance essentially aluminum and incidental elements and impurities, and a cladding layer comprising aluminum or an aluminum alloy different from said first alloy on one or more faces thereof, said sheet having a minimum long transverse yield strength of 39 ksi or more and at least 5% improvement over 2024 in (a) T-L fracture toughness property, or (b) fatigue crack growth rate property at a $\Delta K$ level of ksi$\sqrt{}$in or more, or in both said properties.

78. An aluminum alloy sheet or plate product comprising a first aluminum base alloy consisting essentially of, by weight, about 3.9 to 4.5% copper, about 1.2 to 1.8% magnesium, about 0.3 to 0.9% manganese, the balance essentially aluminum and incidental elements and impurities, and a cladding layer comprising aluminum or an aluminum alloy different from said first alloy on one or more faces thereof, said sheet having a long transverse yield strength of 39 ksi or more together with one or more of the following properties: (a) a maximum fatigue crack growth rate not greater than 10% above one or more of the levels shown in FIG. 8 or 9; (b) a minimum T-L fracture toughness $K_c$ of at least 140 ksi$\sqrt{}$in; (c) a minimum T-L fracture toughness $K_{app}$ of at least 80 ksi$\sqrt{}$in.

79. An aluminum alloy sheet or plate product comprising a first aluminum base alloy consisting essentially of, by weight, about 4 to 4.5% copper, about 1.2 to 1.5% magnesium, about 0.4 to 0.7% manganese, and containing not more than about 0.15% iron and not more than about 0.15% silicon, the balance essentially aluminum and incidental elements and impurities, and a cladding layer on one or more faces thereof, said sheet having a long transverse yield strength of 40 ksi or more and a minimum T-L fracture toughness $K_c$ of 140 ksi$\sqrt{}$in or more and a fatigue crack growth rate not greater than 5% above one or more of the levels shown in FIG. 8 or 9.

80. An aluminum alloy sheet product having a core of an aluminum base alloy consisting essentially of, by weight, about 4 to 4.5% copper, about 1.2 to 1.5% magnesium, about 0.4 to 0.7% manganese, and containing not more than about 0.15% iron and not more than about 0.15% silicon, the balance essentially aluminum and incidental elements and impurities, and a cladding layer on one or more faces thereof, said sheet having a long transverse yield strength of 39 ksi or more and a minimum T-L fracture toughness $K_{app}$ of 80 ksi$\sqrt{}$in. or more and a fatigue crack growth rate not greater than 5% above one or more of the levels shown in FIG. 8 or 9.

81. An aluminum alloy sheet or plate product comprising an aluminum base alloy consisting essentially of, by weight, about 3.8 to 4.5% copper, about 1.2 to 1.8% magnesium, about 0.3 to 0.9% manganese, and containing not more than about 0.15% iron and not more than about 0.15% silicon, the balance essentially aluminum and incidental elements and impurities, said aluminum alloy having a long transverse yield strength of 39 ksi or more and exhibiting an average fatigue crack growth rate of not over $1.4 \times 10^{-4}$ inch per cycle for growing a crack from about 1.7 inch to about 1 inch at a frequency of about 25 hertz and a stress ratio R of 0.1 and a substantially constant $\Delta K$ of about 30 ksi$\sqrt{}$in in an atmosphere of about 90% or more relative humidity.

82. An aluminum alloy sheet or plate product comprising an aluminum base alloy consisting essentially of, by weight, about 3.8 to 4.5% copper, about 1.2 to 1.8% magnesium, about 0.3 to 0.9% manganese, and containing not more than about 0.15% iron and not more than about 0.15% silicon, the balance essentially aluminum and incidental elements and impurities, and a cladding layer comprising aluminum or an aluminum alloy different from said core alloy on one or more faces thereof, said sheet having a long transverse yield strength of 39 ksi or more and exhibiting an average fatigue crack growth rate of not over $1.4 \times 10^{-4}$ inch per cycle for growing a crack from about 1.7 inch to about 1 inch at a frequency of about 25 hertz and a stress ratio R of 0.1 and a substantially constant $\Delta K$ of about 30 ksi$\sqrt{}$in in an atmosphere of about 90% or more relative humidity.

83. A vehicular panel comprising an aluminum alloy sheet product comprising an aluminum base alloy consisting essentially of, by weight, about 3.8 to 4.5% copper, about 1.2 to 1.8% magnesium, about 0.3 to 0.9% manganese, the balance essentially aluminum and incidental elements and impurities, said sheet product having a long transverse yield strength of 39 ksi or more and at least 5% improvement over 2024 in (a) T-L fracture toughness property, or (b) fatigue crack growth rate property at a $\Delta K$ level of 10 ksi$\sqrt{}$in or more, or in both said properties.

84. Aircraft skin comprising an aluminum alloy sheet or plate product comprising an aluminum base alloy consisting essentially of, by weight, about 3.8 to 4.5% copper, about 1.2 to 1.8% magnesium, about 0.3 to 0.9% manganese, the balance essentially aluminum and incidental elements and impurities, said sheet product having a long transverse yield strength of 39 ksi or more and at least 5% improvement over 2024 in (a) T-L fracture toughness property, or (b) fatigue crack growth rate property at a $\Delta K$ level of 15 ksi$\sqrt{}$in or more, or in both said properties.

85. Aircraft skin comprising an aluminum alloy sheet or plate product comprising an aluminum base alloy consisting essentially of, by weight, about 3.9 to 4.5% copper, about 1.2 to 1.8% magnesium, about 0.3 to 0.9% manganese, less than 0.2% iron, less than 0.2% silicon, the balance essentially aluminum and incidental elements and impurities, and a cladding layer comprising aluminum or an aluminum alloy different from said core alloy on one or more faces thereof, said sheet product having a minimum long transverse yield strength of 39 ksi or more and at least 5% improvement over 2024 in (a) T-L fracture toughness property, or (b) fatigue crack growth rate property at a $\Delta K$ level of 15 ksi$\sqrt{}$in or more, or in both said properties.

86. Aircraft skin comprising an aluminum alloy product comprising an aluminum base alloy consisting essentially of, by weight, about 3.9 to 4.5% copper, about 1.2 to 1.5% magnesium, about 0.4 to 0.7% manganese, and containing not more than about 0.15% iron and not more than about 0.15% silicon, the balance essentially aluminum and incidental elements and impurities, and a cladding layer comprising aluminum or an aluminum alloy different from said core alloy on one or more faces thereof, said aluminum product having a long transverse yield strength of 39 ksi or more together with one or more of the following properties: (a) a maximum fatigue crack growth rate not greater than 5% above one or more of the levels shown in FIG. 8 or 9; (b) a minimum T-L fracture toughness $K_c$ of at least 140 ksi$\sqrt{}$in; (c) a minimum T-L fracture toughness $K_{app}$ of at least 80 ksi$\sqrt{}$in.

87. Aircraft skin comprising an aluminum alloy product comprising an aluminum base alloy consisting essentially of, by weight, about 3.8 to 4.5% copper, about 1.2 to 1.8% magnesium, about 0.3 to 0.9% manganese, and containing not more than about 0.15% iron and not more than about 0.15% silicon, the balance essentially aluminum and incidental elements and impurities, said aluminum alloy product having a long transverse yield strength of 39 ksi or more together with one or more of the following properties: (a) a maximum fatigue crack growth rate not greater than 10% above one or more of the levels shown in FIGS. 8 or 9; (b) a T-L fracture toughness $K_c$ of at least 140 ksi$\sqrt{}$in; (c) a T-L fracture toughness $K_{app}$ of at least 80 ksi$\sqrt{}$in.

88. Aircraft fuselage skin comprising an aluminum alloy sheet product comprising an aluminum base alloy consisting essentially of, by weight, about 3.8 to 4.5% copper, about 1.2 to 1.8% magnesium, about 0.3 to 0.9% manganese, the balance essentially aluminum and incidental elements and impurities, said sheet having a long transverse yield strength of 40 ksi or more and at least 5% improvement over 2024 in (a) T-L fracture toughness property, or (b) fatigue crack growth rate property at a ΔK level of 15 ksi$\sqrt{}$in or more, or in both said properties.

89. Aircraft fuselage skin comprising an aluminum alloy product comprising an aluminum base alloy consisting essentially of, by weight, about 3.9 to 4.5% copper, about 1.2 to 1.8% magnesium, about 0.3 to 0.9% manganese, the balance essentially aluminum and incidental elements and impurities, said aluminum alloy product having a long transverse yield strength of 40 ksi or more together with one or more of the following properties: (a) a fatigue crack growth rate not greater than 5% above one or more of the levels shown in FIG. 8 or 9; (b) a T-L fracture toughness $K_c$ of at least 140 ksi$\sqrt{}$in; (c) a T-L fracture toughness $K_{app}$ of at least 80 ksi$\sqrt{}$in.

90. Aircraft fuselage skin comprising an aluminum alloy sheet product comprising an aluminum base alloy consisting essentially of, by weight, about 3.8 to 4.5% copper, about 1.2 to 1.8% magnesium, about 0.3 to 0.9% manganese, the balance essentially aluminum and incidental elements and impurities, and a cladding layer comprising aluminum or an aluminum alloy different from said core alloy on one or more faces thereof, said sheet having a long transverse yield strength of 40 ksi or more and at least 5% improvement over 2024 in (a) T-L fracture toughness property, or (b) fatigue crack growth rate property at a ΔK level of 15 ksi$\sqrt{}$in or more, or in both said properties.

91. Aircraft fuselage skin comprising an aluminum alloy product comprising an aluminum base alloy consisting essentially of, by weight, about 3.9 to 4.5% copper, about 1.2 to 1.5% magnesium, about 0.4 to 0.8% manganese, the balance essentially aluminum and incidental elements and impurities, and a cladding layer comprising aluminum or an aluminum alloy different from said core alloy on one or more faces thereof, said sheet having a long transverse yield strength of 40 ksi or more together with one or more of the following properties: (a) a fatigue crack growth rate not greater than one or more of the levels shown in FIGS. 8 or 9; (b) a T-L fracture toughness $K_c$ of at least 150 ksi$\sqrt{}$in; (c) a T-L fracture toughness $K_{app}$ of at least 90 ksi$\sqrt{}$in.

92. An aircraft fuselage, or fuselage portion, having reduced tear retarding auxiliary components, said fuselage or portion comprising fuselage skin comprising an aluminum alloy sheet or plate product comprising an aluminum base alloy consisting essentially of, by weight, about 3.8 to 4.5% copper, about 1.2 to 1.8% magnesium, about 0.3 to 0.9% manganese, the balance essentially aluminum and incidental elements and impurities, said sheet having a long transverse yield strength of 39 ksi or more and at least 5% improvement over 2024 in (a) T-L fracture toughness property, or (b) fatigue crack growth rate property at a ΔK level of 20 ksi$\sqrt{}$in or more, or in both said properties.

93. An aircraft fuselage, or fuselage portion, having reduced tear retarding auxiliary components, said fuselage or portion comprising an aluminum alloy sheet or plate product comprising an aluminum base alloy consisting essentially of, by weight, about 3.8 to 4.5% copper, about 1.2 to 1.8% magnesium, about 0.3 to 0.9% manganese, the balance essentially aluminum and incidental elements and impurities, said aluminum alloy product having a long transverse yield strength of 38 ksi or more together with one or more of the following properties: (a) a maximum fatigue crack growth rate not greater than 5% above one or more of the levels shown in FIG. 8 or 9; (b) a minimum T-L fracture toughness $K_c$ of at least 150 ksi$\sqrt{}$in; (c) a minimum T-L fracture toughness $K_{app}$ of at least 90 ksi$\sqrt{}$in.

94. An aircraft fuselage, or fuselage portion, having reduced tear retarding auxiliary components, said fuselage or portion comprising fuselage skin comprising an aluminum alloy sheet product comprising an aluminum base alloy consisting essentially of, by weight, about 3.8 to 4.5% copper, about 1.2 to 1.8% magnesium, about 0.3 to 0.9% manganese, the balance essentially aluminum and incidental elements and impurities, and a cladding layer comprising aluminum or an aluminum alloy different from said core alloy on one or more faces thereof, said sheet having a long transverse yield strength of 39 ksi or more and at least 5% improvement over 2024 in (a) T-L fracture toughness property, or (b) fatigue crack growth rate property at a ΔK level of 20 ksi$\sqrt{}$in or more, or in both said properties.

95. An aircraft fuselage, or fuselage portion, having reduced tear retarding auxiliary components, said fuselage or portion comprising fuselage skin comprising an aluminum alloy product comprising an aluminum base alloy consisting essentially of, by weight, about 4 to 4.5% copper, about 1.2 to 1.5% magnesium, about 0.3 to 0.8% manganese, and containing not more than about 0.15% iron and not more than about 0.15% silicon, the balance essentially aluminum and incidental elements and impurities, and a cladding layer comprising aluminum or an aluminum alloy different from said core alloy on one or more faces thereof, said sheet having a minimum long transverse yield strength of 39 ksi or more together with one or more of the following properties: (a) a maximum fatigue crack growth rate not greater than one or more of the levels shown in FIGS. 8 or 9; (b) a minimum T-L fracture toughness $K_c$ of at least 150 ksi$\sqrt{\text{in}}$; (c) a minimum T-L fracture toughness $K_{app}$ of at least 90 ksi$\sqrt{\text{in}}$.

96. An aircraft having a member comprising an aluminum alloy sheet product comprising an aluminum base alloy consisting essentially of, by weight, about 3.8 to 4.5% copper, about 1.2 to 1.8% magnesium, about 0.3 to 0.9% manganese, and containing about 0.01 to 0.15% iron, about 0.01 to 0.15% silicon, the balance essentially aluminum and incidental elements and impurities, said sheet having a long transverse yield strength of 40 ksi or more and at least 5% improvement over 2024 in (a) T-L fracture toughness property, or (b) fatigue crack growth rate property at a $\Delta K$ level of 20 ksi$\sqrt{\text{in}}$ or more, or in both said properties.

97. An aircraft having a member comprising an aluminum alloy product comprising an aluminum base alloy consisting essentially of, by weight, about 3.8 to 4.5% copper, about 1.2 to 1.8% magnesium, about 0.3 to 0.9% manganese, less than 0.2% iron, less than 0.2% silicon, the balance essentially aluminum and incidental elements and impurities, said aluminum alloy product having a long transverse yield strength of 40 ksi or more together with one or more of the following properties: (a) a maximum fatigue crack growth rate not greater than 5% above one or more of the levels shown in FIGS. 8 or 9; (b) a minimum T-L fracture toughness $K_c$ of at least 150 ksi$\sqrt{\text{in}}$; (c) a minimum T-L fracture toughness $K_{app}$ of at least 90 ksi$\sqrt{\text{in}}$.

98. An aircraft having skin material comprising an aluminum alloy sheet product comprising an aluminum base alloy consisting essentially of, by weight, about 3.8 to 4.5% copper, about 1.2 to 1.8% magnesium, about 0.3 to 0.9% manganese, less than 0.2% iron, less than 0.2% silicon, the balance essentially aluminum and incidental elements and impurities, and a cladding layer comprising aluminum or an aluminum alloy different from said core alloy on one or more faces thereof, said sheet having a long transverse yield strength of 40 ksi or more and at least 5% improvement over 2024 in (a) T-L fracture toughness property, or (b) fatigue crack growth rate property at a $\Delta K$ level of 20 ksi$\sqrt{\text{in}}$ or more, or in both said properties.

99. An aircraft having skin material comprising an aluminum alloy product comprising an aluminum base alloy consisting essentially of, by weight, about 4 to 4.5% copper, about 1.2 to 1.5% magnesium, about 0.4 to 0.7% manganese, and containing not more than about 0.15% iron and not more than about 0.12% silicon, the balance essentially aluminum and incidental elements and impurities, and a cladding layer comprising aluminum or an aluminum alloy different from said core alloy on one or more faces thereof, said sheet having a long transverse yield strength of 40 ksi or more together with one or more of the following properties: (a) a fatigue crack growth rate not greater than 5% above one or more of the levels shown in FIGS. 8 or 9; (b) a minimum T-L fracture toughness $K_c$ of at least 140 ksi$\sqrt{\text{in}}$; (c) a minimum T-L fracture toughness $K_{app}$ of at least 80 ksi$\sqrt{\text{in}}$.

100. An aircraft having a fuselage skin, said fuselage skin comprising an aluminum alloy sheet product comprising an aluminum base alloy consisting essentially of, by weight, about 3.8 to 4.5% copper, about 1.2 to 1.8% magnesium, about 0.3 to 0.9% manganese, the balance essentially aluminum and incidental elements and impurities, said sheet having a minimum long transverse yield strength of 39 ksi or more and at least 5% improvement over 2024 in (a) T-L fracture toughness property, or (b) fatigue crack growth rate property at a $\Delta K$ levels of 20 ksi$\sqrt{\text{in}}$ or more, or in both said properties.

101. An aircraft having a fuselage skin, said fuselage skin comprising an aluminum alloy product comprising an aluminum base alloy consisting essentially of, by weight, about 3.8 to 4.5% copper, about 1.2 to 1.8% magnesium, about 0.3 to 0.9% manganese, and containing not more than about 0.15% iron and not more than about 0.12% silicon, the balance essentially aluminum and incidental elements and impurities, said aluminum alloy product having a long transverse yield strength of 40 ksi or more together with one or more of the following properties: (a) a maximum fatigue crack growth rate not greater than 5% above one or more of the levels shown in FIGS. 8 or 9; (b) a minimum T-L fracture toughness $K_c$ of at least 140 ksi$\sqrt{\text{in}}$; (c) a minimum T-L fracture toughness $K_{app}$ of at least 80 ksi$\sqrt{\text{in}}$.

102. An aircraft having a fuselage skin, said fuselage skin comprising an aluminum alloy sheet product comprising an aluminum base alloy consisting essentially of, by weight, about 3.8 to 4.5% copper, about 1.2 to 1.8% magnesium, about 0.3 to 0.9% manganese, the balance essentially aluminum and incidental elements and impurities, and a cladding layer comprising aluminum or an aluminum alloy different from said core alloy on one or more faces thereof, said sheet having a long transverse yield strength of 39 ksi or more and at least 5% improvement over 2024 in (a) T-L fracture toughness property, or (b) fatigue crack growth rate property at a $\Delta K$ level of 20 ksi$\sqrt{\text{in}}$ or more, or in both said properties.

103. An aircraft having a fuselage skin, said fuselage skin comprising an aluminum alloy product comprising an aluminum base alloy consisting essentially of, by weight, about 4 to 4.5% copper, about 1.2 to 1.5% magnesium, about 0.4 to 0.7% manganese, and containing not more than about 0.15% iron and not more than about 0.12% silicon, the balance essentially aluminum and incidental elements and impurities, and a cladding layer comprising aluminum or an aluminum alloy different from said core alloy on one or more faces thereof, said sheet having a long transverse yield strength of 39 ksi or more together with one or more of the following properties: (a) a maximum fatigue crack growth rate not greater than 5% above one or more of the levels shown in FIG. 8 or 9; (b) a minimum T-L fracture toughness $K_c$ of at least 140 ksi$\sqrt{\text{in}}$; (c) a minimum T-L fracture toughness $K_{app}$ of at least 80 ksi$\sqrt{\text{in}}$.

104. A method according to claim 64 wherein said recitation (h) comprises stretching.

105. A method according to claim 63 wherein said recitation (g) comprises stretching.

106. A method according to claim 64 wherein said recitation (h) comprises cold rolling.

107. A method according to claim 63 wherein said recitation (g) comprises cold rolling.

108. A method according to claim 64 wherein solution heat treating is preceded by cold rolling.

109. A method according to claim 63 wherein solution heat treating is preceded by cold rolling.

110. The method according to claim 1 wherein said stock further comprises a cladding on said alloy, said cladding being aluminum or an alloy thereof different than the said alloy.

111. The method according to claim 1 wherein said hot rolling in recitation (b) reduces the thickness of said stock by at least 40%.

112. The method according to claim 22 wherein after said solution heat treating, a forming or shaping operation is performed above room temperature.

113. The method according to claim 22 wherein after said solution heat treating, a forming or shaping operation is performed at a temperature of 200° F. or higher.

114. The method according to claim 22 wherein after said solution heat treating, a forming or shaping operation is performed at an artificial aging temperature above room temperature.

115. The method according to claim 22 wherein said hot rolling in recitation (b) reduces the thickness of said stock by at least 40%.

116. The method according to claim 28 wherein after said solution heat treating, a forming or shaping operation is performed above room temperature.

117. The method according to claim 28 wherein after said solution heat treating, a forming or shaping operation is performed at a temperature of 200° F. or higher.

118. The method according to claim 28 wherein after said solution heat treating, a forming or shaping operation is performed at an artificial aging temperature above room temperature.

119. The method according to claim 28 wherein said hot rolling in recitation (b) reduces the thickness of said stock by at least 40%.

120. The method according to claim 44 wherein after said solution heat treating, a forming or shaping operation is performed above room temperature.

121. The method according to claim 44 wherein after said solution heat treating, a forming or shaping operation is performed at a temperature of 200° F. or higher.

122. In the method according to claim 65 wherein said shaping operation is performed above room temperature.

123. In the method according to claim 65 wherein said shaping operation is performed at a temperature of 200° F. or higher.

124. A product produced by the method of claim 1, 5, 6, 8, 22, 23, 33, 38, 51, 63 or 64.

125. The product according to claim 71 wherein said $\Delta K$ level is 20 ksi$\sqrt{}$in or more.

126. The product according to claim 76 wherein said $\Delta K$ level is 20 ksi$\sqrt{}$in or more.

127. The product according to claim 77 wherein said $\Delta K$ level is 20 ksi$\sqrt{}$in or more.

128. An aircraft skin according to claim 84 wherein said $\Delta K$ level is 20 ksi$\sqrt{}$in or more.

129. An aircraft according to claim 100 wherein said $\Delta K$ level is 20 ksi$\sqrt{}$in or more.

130. The product according to claim 71 wherein said $\Delta K$ level is 25 ksi$\sqrt{}$in or more.

131. The product according to claim 76 wherein said $\Delta K$ level is 25 ksi$\sqrt{}$in or more.

132. The product according to claim 77 wherein said $\Delta K$ level is 25 ksi$\sqrt{}$in or more.

133. An aircraft skin according to claim 84 wherein said $\Delta K$ level is 25 ksi$\sqrt{}$in or more.

134. An aircraft fuselage, or fuselage portion, according to claim 94 wherein said $\Delta K$ level is 25 ksi$\sqrt{}$in or more.

135. An aircraft according to claim 100 wherein said $\Delta K$ level is 25 ksi$\sqrt{}$in or more.

136. The product according to claim 73 wherein said maximum fatigue crack growth rate is not greater than one or more of the growth rate levels shown in FIG. 8 or 9.

137. The product according to claim 74 wherein said maximum fatigue crack growth rate is not greater than one or more of the growth rate levels shown in FIG. 8 or 9.

138. The product according to claim 75 wherein said maximum fatigue crack growth rate is not greater than one or more of the growth rate levels shown in FIG. 8 or 9.

139. The product according to claim 78 wherein said maximum fatigue crack growth rate is not greater than one or more of the growth rate levels shown in FIG. 8 or 9.

140. The product according to claim 79 wherein said maximum fatigue crack growth rate is not greater than one or more of the growth rate levels shown in FIG. 8 or 9.

141. The product according to claim 80 wherein said maximum fatigue crack growth rate is not greater than one or more of the growth rate levels shown in FIG. 8 or 9.

142. An aircraft skin according to claim 86 wherein said maximum fatigue crack growth rate is not greater than one or more of the growth rate levels shown in FIG. 8 or 9.

143. An aircraft skin according to claim 87 wherein said maximum fatigue crack growth rate is not greater than one or more of the growth rate levels shown in FIG. 8 or 9.

144. An aircraft according to claim 97 wherein said maximum fatigue crack growth rate is not greater than one or more of the growth rate levels shown in FIG. 8 or 9.

145. An aircraft according to claim 101 wherein said maximum fatigue crack growth rate is not greater than one or more of the growth rate levels shown in FIG. 8 or 9.

146. The product according to claim 72 wherein said maximum fatigue crack growth rate is not greater than one or more of the growth rate levels shown in FIG. 8 or 9 at $\Delta K=20$ ksi$\sqrt{}$in or more.

147. The product according to claim 73 wherein said maximum fatigue crack growth rate is not greater than one or more of the growth rate levels shown in FIG. 8 or 9 at $\Delta K=20$ ksi$\sqrt{}$in or more.

148. The product according to claim 74 wherein said maximum fatigue crack growth rate is not greater than one or more of the growth rate levels shown in FIG. 8 or 9 at $\Delta K=20$ ksi$\sqrt{}$in or more.

149. The product according to claim 75 wherein said maximum fatigue crack growth rate is not greater than one or more of the growth rate levels shown in FIG. 8 or 9 at $\Delta K=20$ ksi$\sqrt{}$in or more.

150. The product according to claim 78 wherein said maximum fatigue crack growth rate is not greater than one or more of the growth rate levels shown in FIG. 8 or 9 at $\Delta K=20$ ksi$\sqrt{}$in or more.

151. An aircraft skin according to claim 87 wherein said maximum fatigue crack growth rate is not greater than one or more of the growth rate levels shown in FIG. 8 or 9 at $\Delta K=20$ ksi$\sqrt{}$in or more.

152. An aircraft fuselage skin according to claim 89 wherein said maximum fatigue crack growth rate is not greater than one or more of the growth rate levels shown in FIG. 8 or 9 at $\Delta K=20$ ksi$\sqrt{}$in or more.

153. An aircraft fuselage skin according to claim 91 wherein said maximum fatigue crack growth rate is not greater than one or more of the growth rate levels shown in FIG. 8 or 9 at $\Delta K=20$ ksi$\sqrt{}$in or more.

154. An aircraft fuselage, or fuselage portion, according to claim 93 wherein said maximum fatigue crack growth rate is not greater than one or more of the growth rate levels shown in FIG. 8 or 9 at $\Delta K=20$ ksi$\sqrt{}$in or more.

155. An aircraft according to claim 101 wherein said maximum fatigue crack growth rate is not greater than one or more of the growth rate levels shown in FIG. 8 or 9 at $\Delta K=20$ ksi$\sqrt{}$in or more 156. The product according to claim 72 wherein said maximum fatigue crack growth rate is not greater than one or more of the growth rate levels shown in FIG. 8 or 9 at $\Delta K=25$ ksi$\sqrt{}$in or more.

157. The product according to claim 73 wherein said maximum fatigue crack growth rate is not greater than one or more of the growth rate levels shown in FIG. 8 or 9 at $\Delta K=25$ ksi$\sqrt{}$in or more.

158. The product according to claim 74 wherein said maximum fatigue crack growth rate is not greater than one or more of the growth rate levels shown in FIG. 8 or 9 at $\Delta K=25$ ksi$\sqrt{}$in or more.

159. The product according to claim 75 wherein said maximum fatigue crack growth rate is not greater than one or more of the growth rate levels shown in FIG. 8 or 9 at $\Delta K=25$ ksi$\sqrt{}$in or more.

160. The product according to claim 78 wherein said maximum fatigue crack growth rate is not greater than one or more of the growth rate levels shown in FIG. 8 or 9 at $\Delta K=25$ ksi$\sqrt{}$in or more.

161. An aircraft skin according to claim 86 wherein said maximum fatigue crack growth rate is not greater than one or more of the growth rate levels shown in FIG. 8 or 9 at $\Delta K=25$ ksi$\sqrt{}$in or more.

162. An aircraft skin according to claim 87 wherein said maximum fatigue crack growth rate is not greater than one or more of the growth rate levels shown in FIG. 8 or 9 at $\Delta K=25$ ksi$\sqrt{}$in or more.

163. An aircraft fuselage skin according to claim 89 wherein said maximum fatigue crack growth rate is not greater than one or more of the growth rate levels shown in FIG. 8 or 9 at $\Delta K=25$ ksi$\sqrt{}$in or more.

164. An aircraft fuselage skin according to claim 91 wherein said maximum fatigue crack growth rate is not greater than one or more of the growth rate levels shown in FIG. 8 or 9 at $\Delta K=25$ ksi$\sqrt{}$in or more.

165. An aircraft fuselage, or fuselage portion, according to claim 93 wherein said maximum fatigue crack growth rate is not greater than one or more of the growth rate levels shown in FIG. 8 or 9 at $\Delta K=25$ ksi$\sqrt{}$in or more.

166. An aircraft according to claim 101 wherein said maximum fatigue crack growth rate is not greater than one or more of the growth rate levels shown in FIG. 8 or 9 at $\Delta K=25$ ksi$\sqrt{}$in or more.

167. The product according to claim 73 wherein said product has a minimum T-L fracture toughness $K_c$ of 140 ksi$\sqrt{}$in or more.

168. The product according to claim 78 wherein said product has a minimum T-L fracture toughness $K_c$ of 140 ksi$\sqrt{}$in or more.

169. An aircraft skin according to claim 86 wherein said aluminum alloy product has a minimum T-L fracture toughness $K_c$ of 140 ksi$\sqrt{}$in or more.

170. An aircraft skin according to claim 87 wherein said aluminum alloy product has a minimum T-L fracture toughness $K_c$ of 140 ksi$\sqrt{}$in or more.

171. An aircraft fuselage skin according to claim 89 wherein said aluminum alloy product has a minimum T-L fracture toughness $K_c$ of 140 ksi$\sqrt{}$in or more.

172. The product according to claim 73 wherein said product has a minimum T-L fracture toughness $K_c$ of 145 ksi$\sqrt{}$in or more.

173. The product according to claim 74 wherein said product has a minimum T-L fracture toughness $K_c$ of 145 ksi$\sqrt{}$in or more.

174. The product according to claim 74 wherein said product has a minimum T-L fracture toughness $K_c$ of 145 ksi$\sqrt{}$in or more.

175. The product according to claim 78 wherein said product has a minimum T-L fracture toughness $K_c$ of 145 ksi$\sqrt{}$in or more.

176. The product according to claim 79 wherein said product has a minimum T-L fracture toughness $K_c$ of 145 ksi$\sqrt{}$in or more.

177. An aircraft skin according to claim 86 wherein said aluminum alloy product has a minimum T-L fracture toughness $K_c$ of 145 ksi$\sqrt{}$in or more.

178. An aircraft skin according to claim 87 wherein said aluminum alloy product has a minimum T-L fracture toughness $K_c$ of 145 ksi$\sqrt{}$in or more.

179. An aircraft fuselage skin according to claim 89 wherein said aluminum alloy product has a minimum T-L fracture toughness $K_c$ of 145 ksi$\sqrt{}$in or more.

180. An aircraft according to claim 101 wherein said aluminum alloy product has a minimum T-L fracture toughness $K_c$ of 145 ksi$\sqrt{}$in or more.

181. An aircraft according to claim 103 wherein said aluminum alloy product has a minimum T-L fracture toughness $K_c$ of 145 ksi$\sqrt{}$in or more.

182. The product according to claim 73 wherein said product has a minimum T-L fracture toughness $K_c$ of 150 ksi$\sqrt{}$in or more.

183. The product according to claim 74 wherein said product has a minimum T-L fracture toughness $K_c$ of 150 ksi$\sqrt{}$in or more.

184. The product according to claim 74 wherein said product has a minimum T-L fracture toughness $K_c$ of 150 ksi$\sqrt{}$in or more.

185. The product according to claim 78 wherein said product has a minimum T-L fracture toughness $K_c$ of 150 ksi$\sqrt{}$in or more.

186. The product according to claim 79 wherein said product has a minimum T-L fracture toughness $K_c$ of 150 ksi$\sqrt{}$in or more.

187. An aircraft skin according to claim 86 wherein said aluminum alloy product has a minimum T-L fracture toughness $K_c$ of 150 ksi$\sqrt{}$in or more.

188. An aircraft skin according to claim 87 wherein said aluminum alloy product has a minimum T-L fracture toughness $K_c$ of 150 ksi$\sqrt{}$in or more.

189. An aircraft fuselage skin according to claim 89 wherein said aluminum alloy product has a minimum T-L fracture toughness $K_c$ of 150 ksi$\sqrt{}$in or more.

190. An aircraft according to claim 101 wherein said aluminum alloy product has a minimum T-L fracture toughness $K_c$ of 150 ksi$\sqrt{}$in or more.

191. An aircraft according to claim 103 wherein said aluminum alloy product has a minimum T-L fracture toughness $K_c$ of 150 ksi$\sqrt{}$in or more.

192. The product according to claim 73 wherein said product has a minimum T-L fracture toughness $K_{app}$ of 80 ksi$\sqrt{}$in or more.

193. An aircraft skin according to claim 86 wherein said aluminum alloy product has a minimum T-L fracture toughness $K_{app}$ of 80 ksi$\sqrt{}$in or more.

194. An aircraft skin according to claim 87 wherein said aluminum alloy product has a minimum T-L fracture toughness $K_{app}$ of 80 ksi$\sqrt{}$in or more.

195. An aircraft fuselage skin according to claim 89 wherein said aluminum alloy product has a minimum T-L fracture toughness $K_{app}$ of 80 ksi$\sqrt{}$in or more.

196. The product according to claim 73 wherein said product has a minimum T-L fracture toughness $K_{app}$ of 85 ksi$\sqrt{}$in or more.

197. The product according to claim 75 wherein said product has a minimum T-L fracture toughness $K_{app}$ of 85 ksi$\sqrt{}$in or more.

198. The product according to claim 75 wherein said product has a minimum T-L fracture toughness $K_{app}$ of 85 ksi$\sqrt{}$in or more.

199. The product according to claim 78 wherein said product has a minimum T-L fracture toughness $K_{app}$ of 85 ksi$\sqrt{}$in or more.

200. The product according to claim 80 wherein said product has a minimum T-L fracture toughness $K_{app}$ of 85 ksi$\sqrt{}$in or more.

201. An aircraft fuselage skin according to claim 89 wherein said aluminum alloy product has a minimum T-L fracture toughness $K_{app}$ of 85 ksi$\sqrt{}$in or more.

202. An aircraft according to claim 101 wherein said aluminum alloy product has a minimum T-L fracture toughness $K_{app}$ of 85 ksi$\sqrt{}$in or more.

203. An aircraft according to claim 103 wherein said aluminum alloy product has a minimum T-L fracture toughness $K_{app}$ of 85 ksi$\sqrt{}$in or more.

204. The product according to claim 73 wherein said product has a minimum T-L fracture toughness $K_{app}$ of 90 ksi$\sqrt{}$in or more.

205. The product according to claim 75 wherein said product has a minimum T-L fracture toughness $K_{app}$ of 90 ksi$\sqrt{}$in or more.

206. The product according to claim 75 wherein said product has a minimum T-L fracture toughness $K_{app}$ of 90 ksi$\sqrt{}$in or more.

207. The product according to claim 78 wherein said product has a minimum T-L fracture toughness $K_{app}$ of 90 ksi$\sqrt{}$in or more.

208. The product according to claim 80 wherein said product has a minimum T-L fracture toughness $K_{app}$ of 90 ksi$\sqrt{}$in or more.

209. An aircraft skin according to claim 86 wherein said aluminum alloy product has a minimum T-L fracture toughness $K_{app}$ of 90 ksi$\sqrt{}$in or more.

210. An aircraft skin according to claim 87 wherein said aluminum alloy product has a minimum T-L fracture toughness $K_{app}$ of 90 ksi$\sqrt{}$in or more.

211. An aircraft fuselage skin according to claim 89 wherein said aluminum alloy product has a minimum T-L fracture toughness $K_{app}$ of 90 ksi$\sqrt{}$in or more.

212. An aircraft according to claim 101 wherein said aluminum alloy product has a minimum T-L fracture toughness $K_{app}$ of 90 ksi$\sqrt{}$in or more.

213. An aircraft according to claim 103 wherein said aluminum alloy product has a minimum T-L fracture toughness $K_{app}$ of 90 ksi$\sqrt{}$in or more.

214. The product according to claim 73 wherein said fatigue crack growth rate levels for FIG. 8 or 9 are at $\Delta K = 20$ ksi$\sqrt{}$in or more.

215. The product according to claim 79 wherein said fatigue crack growth rate levels for FIG. 8 or 9 are at $\Delta K = 20$ ksi$\sqrt{}$in or more.

216. The product according to claim 80 wherein said fatigue crack growth rate levels for FIG. 8 or 9 are at $\Delta K = 20$ ksi$\sqrt{}$in or more.

217. An aircraft skin according to claim 84 wherein said fatigue crack growth rate level is at $\Delta K = 20$ ksi$\sqrt{}$in or more.

218. An aircraft skin according to claim 86 wherein said fatigue crack growth rate levels for FIG. 8 or 9 are at $\Delta K = 20$ ksi$\sqrt{}$in or more.

219. An aircraft skin according to claim 87 wherein said fatigue crack growth rate levels for FIG. 8 or 9 are at $\Delta K = 20$ ksi$\sqrt{}$in or more.

220. An aircraft fuselage skin according to claim 89 wherein said fatigue crack growth rate levels for FIG. 8 or 9 are at $\Delta K = 20$ ksi$\sqrt{}$in or more.

221. An aircraft fuselage skin according to claim 91 wherein said fatigue crack growth rate levels for FIG. 8 or 9 are at $\Delta K = 20$ ksi$\sqrt{}$in or more.

222. An aircraft according to claim 101 wherein said fatigue crack growth rate levels for FIG. 8 or 9 are at $\Delta K = 20$ ksi$\sqrt{}$in or more.

223. The product according to claim 78 wherein said fatigue crack growth rate levels for FIG. 8 or 9 are at $\Delta K = 25$ ksi$\sqrt{}$in or more.

224. The product according to claim 79 wherein said fatigue crack growth rate levels for FIG. 8 or 9 are at $\Delta K = 25$ ksi$\sqrt{}$in or more.

225. The product according to claim 80 wherein said fatigue crack growth rate levels for FIG. 8 or 9 are at $\Delta K = 25$ ksi$\sqrt{}$in or more.

226. An aircraft skin according to claim 86 wherein said fatigue crack growth rate levels for FIG. 8 or 9 are at $\Delta K = 25$ ksi$\sqrt{}$in or more.

227. An aircraft skin according to claim 87 wherein said fatigue crack growth rate levels for FIG. 8 or 9 are at $\Delta K = 25$ ksi$\sqrt{}$in or more.

228. An aircraft skin according to claim 89 wherein said fatigue crack growth rate levels for FIG. 8 or 9 are at $\Delta K = 25$ ksi$\sqrt{}$in or more.

229. An aircraft fuselage skin according to claim 91 wherein said fatigue crack growth rate levels for FIG. 8 or 9 are at $\Delta K = 25$ ksi$\sqrt{}$in or more.

230. An aircraft according to claim 101 wherein said fatigue crack growth rate levels for FIG. 8 or 9 are at $\Delta K = 25$ ksi$\sqrt{}$in or more.

231. The product according to claim 81 wherein said average fatigue crack growth rate is not over $1.25 \times 10^{-4}$ inch per cycle.

232. The product according to claim 82 wherein said average fatigue crack growth rate is not over $1.25 \times 10^{-4}$ inch per cycle.

* * * * *

UNITED STATES PATENT AND TRADEMARK OFFICE
CERTIFICATE OF CORRECTION

PATENT NO.   : 5,213,639
DATED        : May 25, 1993
INVENTOR(S)  : Edward L. Colvin et al It is certified that error appears in the above-identified patent and that said Letters Patent is hereby corrected as shown below:

Col. 14, line 14             Before "21.4 x $10^{-5}$" insert --at--

Col. 30, line 23, Claim 72   Change "8 ksi$\sqrt{\text{in}}$" to --80$\sqrt{\text{ksi in}}$--

Col. 31, line 22, Claim 77   Before "ksi$\sqrt{\text{in}}$" insert --15--

Signed and Sealed this

Fifth Day of July, 1994

BRUCE LEHMAN

Attest:

Attesting Officer            Commissioner of Patents and Trademarks